United States Patent
Miller, II et al.

(10) Patent No.: US 10,829,667 B2
(45) Date of Patent: Nov. 10, 2020

(54) METHOD AND APPARATUS FOR APPLYING A STRIP OF MATERIAL OVER AN EDGE ON A STRUCTURE

(71) Applicant: The Boeing Company, Chicago, IL (US)

(72) Inventors: Richard Allen Miller, II, Seattle, WA (US); America Olsen Schaaf, Seattle, WA (US); Kevin L. Braun, Sammamish, WA (US); Mark C. Iden, Burien, WA (US); Brian Henry Korenaga, Shoreline, WA (US); Scott Telford O'Farrell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1137 days.

(21) Appl. No.: 14/808,468

(22) Filed: Jul. 24, 2015

(65) Prior Publication Data

US 2017/0022394 A1    Jan. 26, 2017

(51) Int. Cl.
| | | |
|---|---|---|
| *B29C 70/38* | (2006.01) | |
| *C09J 5/06* | (2006.01) | |
| *B29C 63/00* | (2006.01) | |
| *B64F 5/40* | (2017.01) | |
| *C09J 5/00* | (2006.01) | |

(52) U.S. Cl.
CPC ............ *C09J 5/06* (2013.01); *B29C 63/0039* (2013.01); *B29C 70/388* (2013.01); *B64F 5/40* (2017.01); *C09J 5/00* (2013.01)

(58) Field of Classification Search
CPC ..... B25B 11/02; B29C 70/386; B29C 70/388; B29C 63/0039; B29C 31/08; B29C 70/38; B65C 9/36

USPC ......................... 156/523, 526, 527, 574, 577
See application file for complete search history.

(56) References Cited

U.S. PATENT DOCUMENTS

| | | | |
|---|---|---|---|
| 3,283,052 A | 11/1966 | Munk | |
| 4,211,598 A | 7/1980 | Diegel | |
| 4,849,063 A | 7/1989 | McXinnon | |
| 4,986,864 A | 1/1991 | Heim et al. | |
| 5,439,549 A | 8/1995 | Fryc et al. | |
| 5,527,420 A | 6/1996 | Mauduit et al. | |
| 5,738,749 A | * 4/1998 | Grimshaw | B29C 70/388 |
| | | | 156/312 |
| 6,447,638 B1 | 9/2002 | Maeda | |
| 8,733,276 B2 | 5/2014 | Martin | |
| 2002/0003023 A1 | 1/2002 | Scholz | |
| 2003/0094243 A1 | 5/2003 | Charriere et al. | |
| 2009/0304905 A1 | 12/2009 | Graham et al. | |

(Continued)

FOREIGN PATENT DOCUMENTS

| | | |
|---|---|---|
| DE | 102011111377 B3 | 1/2013 |
| EP | 1967476 A2 | 9/2008 |

(Continued)

OTHER PUBLICATIONS

Extended European Report Search, dated Nov. 30, 2016, regarding Application No. EP16174030.3, 7 pages.

(Continued)

*Primary Examiner* — Scott W Dodds
(74) *Attorney, Agent, or Firm* — Yee & Associates, P.C.

(57) ABSTRACT

An apparatus automatically places, forms and compacts an adhesive strip on an edge of a structure in a single pass.

25 Claims, 18 Drawing Sheets

(56) References Cited

U.S. PATENT DOCUMENTS

| | | | | |
|---|---|---|---|---|
| 2010/0024971 A1* | 2/2010 | Benson | ................ | B29C 70/32 |
| | | | | 156/245 |
| 2012/0328846 A1* | 12/2012 | Blot | .................. | B29B 11/16 |
| | | | | 428/175 |
| 2013/0193607 A1* | 8/2013 | Madsen | ................ | B29C 70/38 |
| | | | | 264/138 |
| 2016/0101960 A1* | 4/2016 | Lam | ................ | B65H 35/0013 |
| | | | | 156/577 |

FOREIGN PATENT DOCUMENTS

| | | | |
|---|---|---|---|
| GB | 2104448 | A | 3/1983 |
| JP | S5831750 | A | 2/1983 |
| JP | H10113987 | A | 5/1998 |
| WO | 2010009805 | A1 | 1/2010 |

OTHER PUBLICATIONS

Japanese Notice of Reasons for Rejection and English translation, dated May 18, 2020, regarding Application No. 2016-095891.

* cited by examiner

METHOD AND APPARATUS FOR APPLYING A STRIP OF MATERIAL OVER AN EDGE ON A STRUCTURE

BACKGROUND INFORMATION

1. Field

The present disclosure generally relates to application of material strips, and deals more particularly with a method and apparatus for applying material strips over an edge on a structure.

2. Background

It is sometimes necessary to apply a strip of material over an edge of a structure for any of various reasons. For example, in the aerospace and similar industries, a strip of material may be applied over an edge of a structure that is subject to impact damage. When impacted, the material strip provides a visual indication of barely visible impact damage (BVID) of areas that may require repair and/or rework in order to meet performance specifications.

In the past, material strips for indicating BVID on stringers and similar elongate stiffeners have been applied to an edge of the structure using hand layup techniques. Hand layup of these material strips is both time-consuming and labor-intensive. Multiple personnel are required to handle and place the material strips, and inaccuracies in material placement are possible due to human error. Tracking of the material strip is difficult and must be controlled with the use of a second operator holding the excess material. In addition to increasing labor costs and reducing production rate, hand layup of the material strips may result in some wrinkling of the strips which have an undesired effect on the performance of the strip.

Accordingly, there is a need for a method and apparatus for applying a strip of material on an edge of a structure that reduces labor costs, increases placement accuracy and improves production flow times.

SUMMARY

The disclosed embodiments provide an apparatus and method for applying a material strip over an edge of an elongate structure, such as a composite stringer. The apparatus includes an end effector coupled with a computer-controlled manipulator, such as a robot, to precisely place, form and compact material strips, such as, for example and without limitation, the BVID-indicating laminated adhesive strips of material on the edges of blades and flanges of stringers or similar structures, in a single pass. The embodiments are capable of accurately placing material strips at a predetermined start position on the blade or a similar edge on a stringer with the use of a vacuum assisted shoe. Wrinkling and errors in placement of the material strips are reduced or eliminated. The need for multiple operating personnel and hand labor is reduced and production flow is increased due to automation of the material strip application process.

Robotic control of the end-effector allows the end-effector to follow a predefined path allowing for twists and rotations in contour while maintaining a centerline position as the end-effector traverses over the length of a stringer. The material strip may be applied in a single pass without causing damage to the stringer or forming wrinkles in the material strip. The end-effector compacts the material strip to the top of the edge while folding it over and compacting it against the sides of the structure. The end-effector also automatically cuts off the strip at a desired location such as at the end of the edge and has the ability to restart the placement of the material strip at any point along the edge. The embodiments permit achieving higher production rates, reduces variations and improved ergonomics.

According to one disclosed embodiment, apparatus is provided for applying a strip of material along an edge of a structure, wherein the edge includes a top and first and second sides. A spool is adapted to hold a strip of material, and a guide roller is provided for guiding the strip of material from the spool onto the edge of the structure. A cutter is provided for cutting the strip of material, and a compaction shoe is provided for compacting the strip of material onto the top of the edge. An optional vacuum suction device assists in holding the strip of material in place while cutting the material. An optional chiller device cools the cutter to decrease resin or adhesive build-up on the cutter. A pre-shaper partially shapes the strip of material down onto the sides of the edge, and a conformer is provided for conforming the pre-formed strip onto the sides of the structure. The conformer includes a pair of spaced apart discs that slidably engage the outer edges of the strip and conform them to the side of the structure. An optional post compaction assembly includes a pair of spaced apart compaction shoes for compacting the outer edges of the strip against the sides of the structure.

According to another disclosed embodiment, apparatus is provided for applying an adhesive strip along an edge of a structure. The apparatus includes a frame movable along the edge, and a supply of the adhesive strip supported on the frame. A cutter is provided that is supported on the frame for cutting the adhesive strip at the end of the edge, or any point along the edge. A compaction shoe supported on the frame is provided for compacting the adhesive strip onto the edge with a preselected level of force, as the frame moves along the edge. A conformance wheel is provided for forming the adhesive strip down onto the sides of the structure along the edge. The conformance wheel includes a pair of conformance discs mounted in spaced apart relationship on a hub. Each of the conformance discs have an inner chamfered surface that engages outer edges of the adhesive strip and conform them to sides of the structure. A pair of compaction shoes compacts the outer edges of the adhesive strip to the sides of the structure.

According to another disclosed embodiment, apparatus is provided for applying a material strip along an edge of a structure. The apparatus comprises a numerically controlled manipulator, and an end effector coupled with the manipulator for placing and compacting the material strip along the edge. The apparatus also includes a numeric controller for controlling the operation of the manipulator and the end effector.

According to still another disclosed embodiment, a method is provided of applying an adhesive strip along an edge of a structure. The method includes moving an apparatus along the edge and feeding the adhesive strip from the apparatus onto the edge as the apparatus moves along the edge. The method also includes pre-shaping outer edges of the adhesive strip away from the edge toward the sides of the structure. The method also includes conforming the outer edges of the adhesive strip to the sides of the structure by passing the outer edges of the adhesive strip through a conformance wheel having a pair of discs that slidably engage the outer edges of the adhesive strip and conform them to the sides of the structure.

According to still another disclosed embodiment, a method is provided of applying an adhesive material strip along an edge of a structure. The method includes drawing the material strip from the material strip supply, and heating the material strip. The method also comprises feeding the material strip to a guide roller, and guiding the material strip on to the edge of the structure. The method further includes compacting the material strip onto the edge, and shaping outer edges of the material strip by partially folding the outer edges of the material strip the method also includes conforming the material strip onto sides of the structure, and compacting the outer edges of the material strip against the sides of the structure.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
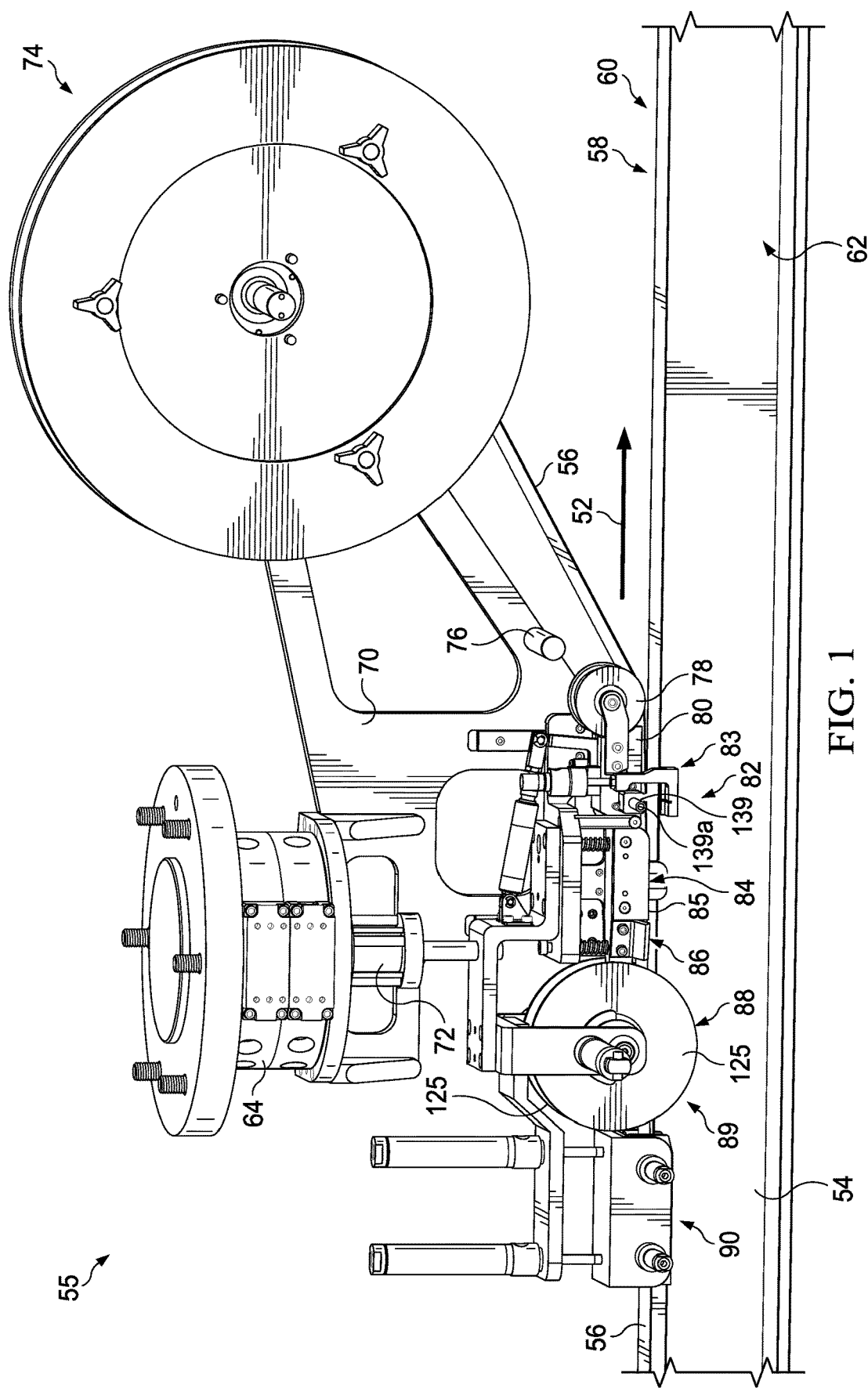
FIG. 1 is an illustration of a perspective view of one side of the end-effector, showing the end-effector in the process of placing and compacting a material strip on an edge of a structure.
Figure 2:
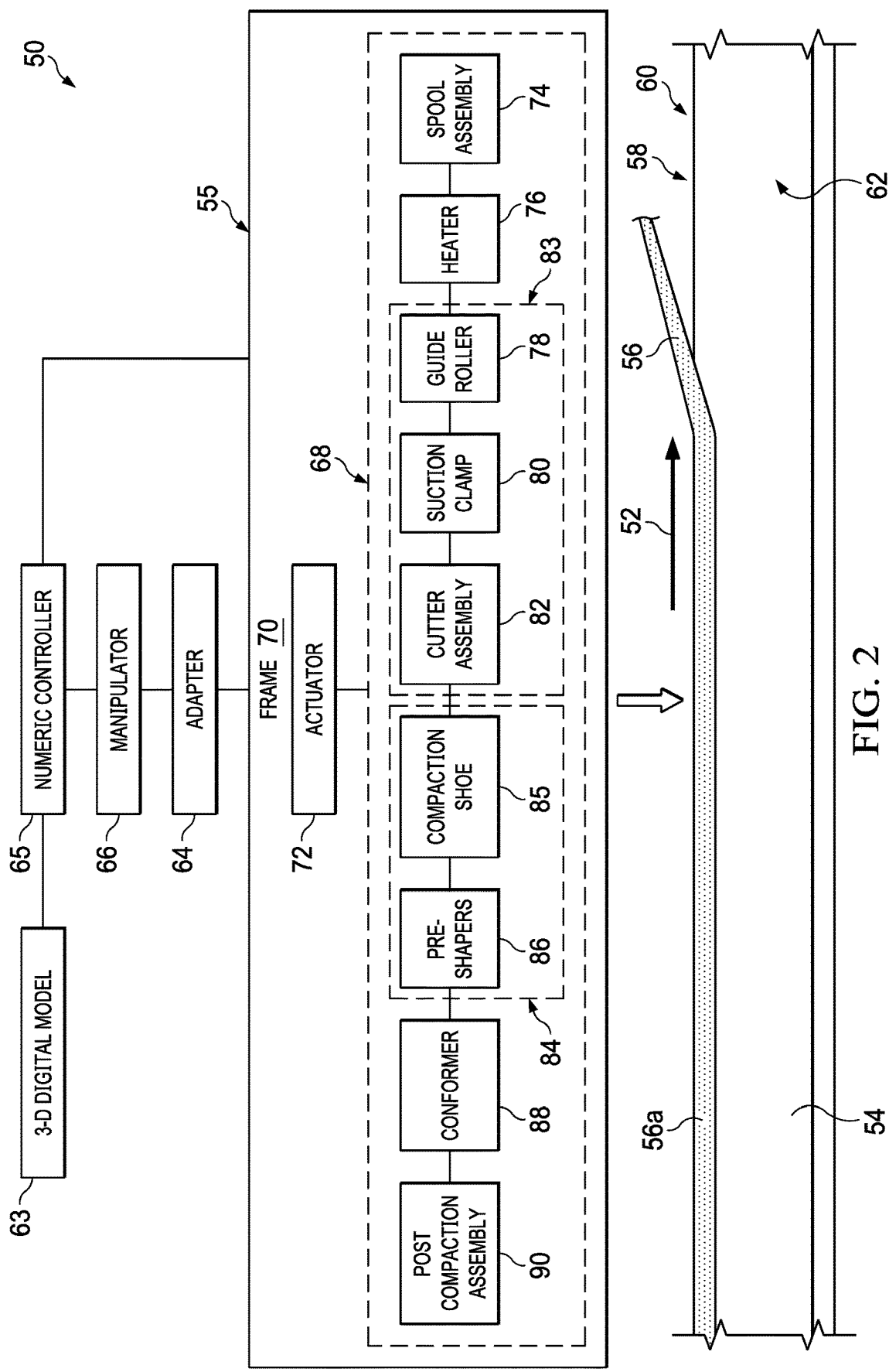
FIG. 2 is an illustration of an overall block and diagrammatic view showing various functional components of the apparatus.

Referring first to FIGS. 1 and 2, the disclosed embodiments relate to a method and apparatus 50 for accurately placing, folding and compacting a strip of material 56 on an edge 58 of an elongate structure 54 such as a stiffener. The apparatus 50 is capable of placing the material strip 56 beginning at a predefined start position on the edge 58, such as at an end of the edge 58, or at any point along the edge 58. The strip of material 56, sometimes simply referred to herein as a strip 56 or a material strip 56, wraps over the top 60 of the edge 58, onto the sides 62 of the structure 54. As will be discussed below, the composition of the material strip 56 will depend on the application and may or may not include a layer of adhesive (not shown in FIGS. 1 and 2) which adheres the strip 56 to the structure 54. In other embodiments, the material strip 56 may be formed of a material such as a pre-preg that is self-adhesive.

In the embodiment discussed below, the structure 54 is a composite laminate, however the principles of the disclosed embodiments are not limited to placement of material strips 56 on composite laminate structures. As will be discussed below in more detail, operating under programmed numeric control, the end-effector 55 is capable of following a predefined path, allowing for twists and rotations in contour of the edge 58, while maintaining a centerline position as the end-effector 55 traverses over the length of the edge 58.

The apparatus 50 includes an end effector 55 having a quick change adapter 64 for mounting the end effector 55 on a manipulator 66 such as, without limitation, an articulated arm, computer-controlled robot, or an automated guided vehicle (not shown). The manipulator 66 is operated by the controller 65 which may be a programmed special-purpose or general purpose computer. The controller 65 has access to a 3-D digital model 63 of the structure 54. Although not shown in the Figures, the structure 54 is mounted on a suitable fixture within a three dimensional coordinate system known to the controller 65.

The controller 65 is programmed to translate the coordinates of the structure 54 into the coordinate system of the manipulator 66. Knowing the coordinates that define the location and orientation of the structure 54 in space, the manipulator 66 moves the end-effector 55 in one direction of travel 52 along the length of the edge 58, following any curves, twists, contours, rotations in contour or undulations that may be present along the edge 58 while maintaining a centerline, as the end-effector 55 traverses the length of the structure 54. In a single pass over the length of the edge 58, the end-effector 55 accurately places the material strip 56 on the edge 58, compacts it to the top 60 of the edge 58, rolls both sides of the strip 56 over the edge 58 and compacts it to the sides 62 of the structure 54 without wrinkling or otherwise damaging the material strip 56, following which it cuts the material strip 56 at a one or more pre-selected locations along the length of the edge 58, such as at the end of the structure 54.

The end-effector 55 includes a number of functional components 68 that are mounted on a frame 70, along with an actuator 72 which may comprise, without limitation a pneumatic or hydraulic cylinder. The actuator 72 functions to move certain of the functional components 68 down into operative proximity to the edge 58 of the structure 54, as will be discussed later. The controller 65 controls operation of the actuator 72, as well as other actuators discussed below which operate other functional components 68 of the end-effector 55.

Referring particularly to FIG. 2, the functional components 68 include a spool assembly 74 adapted to contain a quantity of the material strip 56, an optional heater 76, a guide roller and cutter assembly 83, a compaction shoe assembly 84, a conformer 88 and optionally, a post compaction assembly 90. The optional heater 76 heats and thereby increases the tack level of the material strip 56 before its application to the edge 58. The guide roller and cutter assembly 83 includes a guide roller 78, an optional vacuum suction clamp 80 and a cutter assembly 82. The guide roller 78 aligns and guides the material strip 56 onto the edge 58 and into the compaction shoe assembly 84. The cutter assembly 82 cuts the material strip 56 when the end-effector 55 reaches an end, or any point along the structure 54.

The optional vacuum suction clamp 80 may be provided in some embodiments to assist in drawing the material strip 56 against the cutter assembly 82 to assure a clean cut, while flattening the material strip 56 in preparation for severing the material strip 56. In other embodiments, the vacuum suction clamp 80 may not be required. The compaction shoe assembly 84 includes a compaction shoe 85 and a pair of pre-shapers 86 at the aft end of the compaction shoe 85. The compaction shoe 85 compacts the material strip 56 against the top 60 of the edge 58, following which, the pre-shapers 86 partially fold the material strip 56 down onto the sides 62 of the structure 54, in preparation for being fully folded, conformed and compacted against the sides 62.

Following pre-shaping, the material strip 56 is fed to the conformer 88 which includes a conformance wheel assembly 89 having a pair of discs 125 that fully form the pre-shaped material strip 56, and at least partially compacts the material strip 56 against the sides 62 of the structure 54 as the end effector 55 traverses the length of the structure 54 in the direction of travel 52. In other words, the conformer 88 completes folding of the material strip 56 fully down against the sides 62 of the structure 54. Depending upon the application, optionally, the post compaction assembly 90 may be employed. The post compaction assembly 90 functions to further compact the material strip 56 against the sides 62 of the structure 54, using a pair of later discussed compaction shoes 188 (FIG. 15) which increase the dwell time during which the outer edges 56a (FIG. 4) are undergoing compaction. As will mentioned below, the post compaction assembly 90 may be implemented using any of various alternative mechanisms, including but not limited to pressure applying rollers (not shown).

Figure 3:
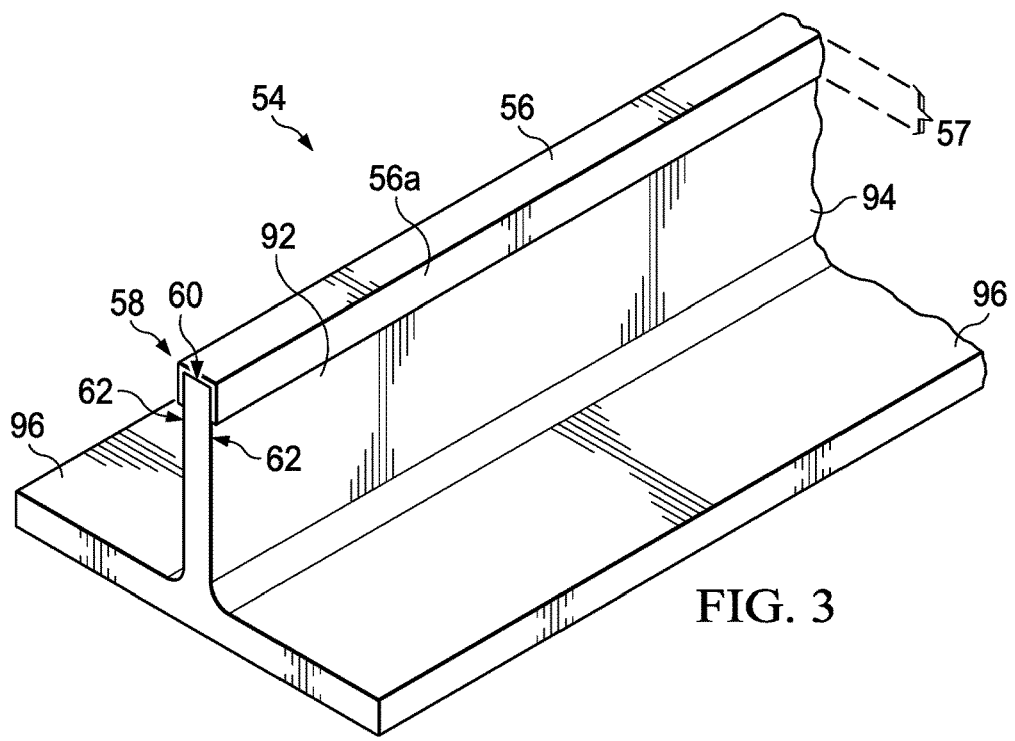
FIG. 3 is an illustration of a fragmentary, perspective view of one end of a blade stringer having a material strip placed on an edge thereof.

As previously mentioned, the disclosed embodiments may be employed to place material strips 56 on edges 58 of a wide range of structures 54. One example of such a structure is shown in FIG. 3 which depicts a composite laminate blade stringer 92 having a web 94, hereinafter referred to herein as a blade 94, and a pair of outwardly turned flanges 96. Although not shown in the Figures, the blade stringer 92 may be fabricated by bonding together or co-curing multiple composite laminate components. The blade 94 includes an edge 58 formed by a top 60 and two sides 62. The disclosed method and apparatus places and compacts the material strip 56 on the top 60, and then folds and compacts outer edges 56a of the material strip 56 onto the two sides 62 blade 94 as the end-effector 55 traverses the length of the stringer 92.

Figure 4:
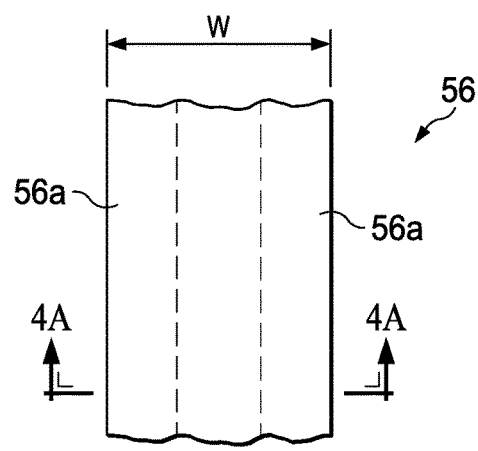
FIG. 4 is an illustration of a fragmentary plan view of a portion of the material strip, prior to being placed on the edge of the blade stringer.
Figure 4A:
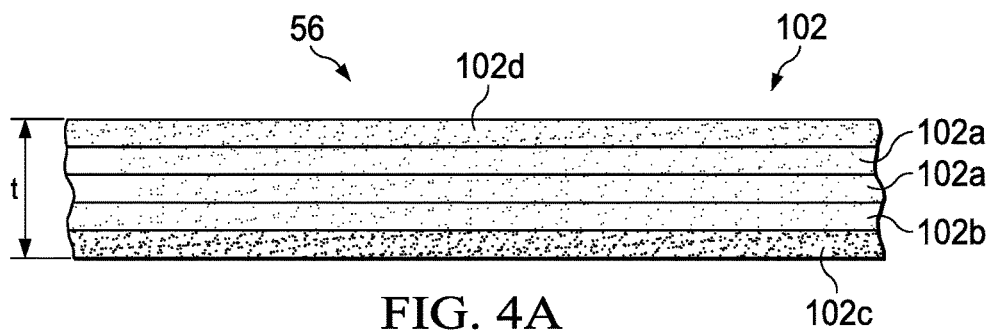
FIG. 4A is an illustration of a cross-sectional view of the material strip taken along the line 4A-4A in FIG. 4.

Referring now to FIG. 4, the material strip 56 may have a width "W" that is sufficient to cover the top 60 as well as the upper portions 57 of the sides 62 of the blade 94 along the length of the stringer 92. Referring to FIG. 4A, in one application, the material strip 56 may comprise multiple laminated plies 102 of one or more materials, having one or more areas, such as the top 60 and upper portions 57 of the edge 58, that, after curing, may be used to indicate BVID along the edge 58. In the illustrated example, the material strip 56 may be a laminate comprising two plies 102a of fiberglass pre-preg fabric, a ply 102b of carbon fiber pre-preg tape, an underlying ply 102c of heat sensitive film adhesive and a top ply 102d of FEP (Fluorinated Ethylene Propylene).

The thickness "t" of the material strip 56, determined in part by the specific materials used and the number of plies 102, will depend on the application. The layer 102c of adhesive is pre-applied on the bottom of the material strip 56, and functions to adhere the strip 56 to the edge 58. Following placement and compaction of the pre-preg material strip 56 on the blade 94, the material strip 56 is cured using the application of heat (thermal curing) or other curing techniques. As previously indicated, the material strip 56 described above in connection with FIGS. 3 and 4 is merely illustrative of a wide range of strip or ribbon-like materials that may be applied to edges of a structure using the disclosed method and apparatus 50.

Figure 5:
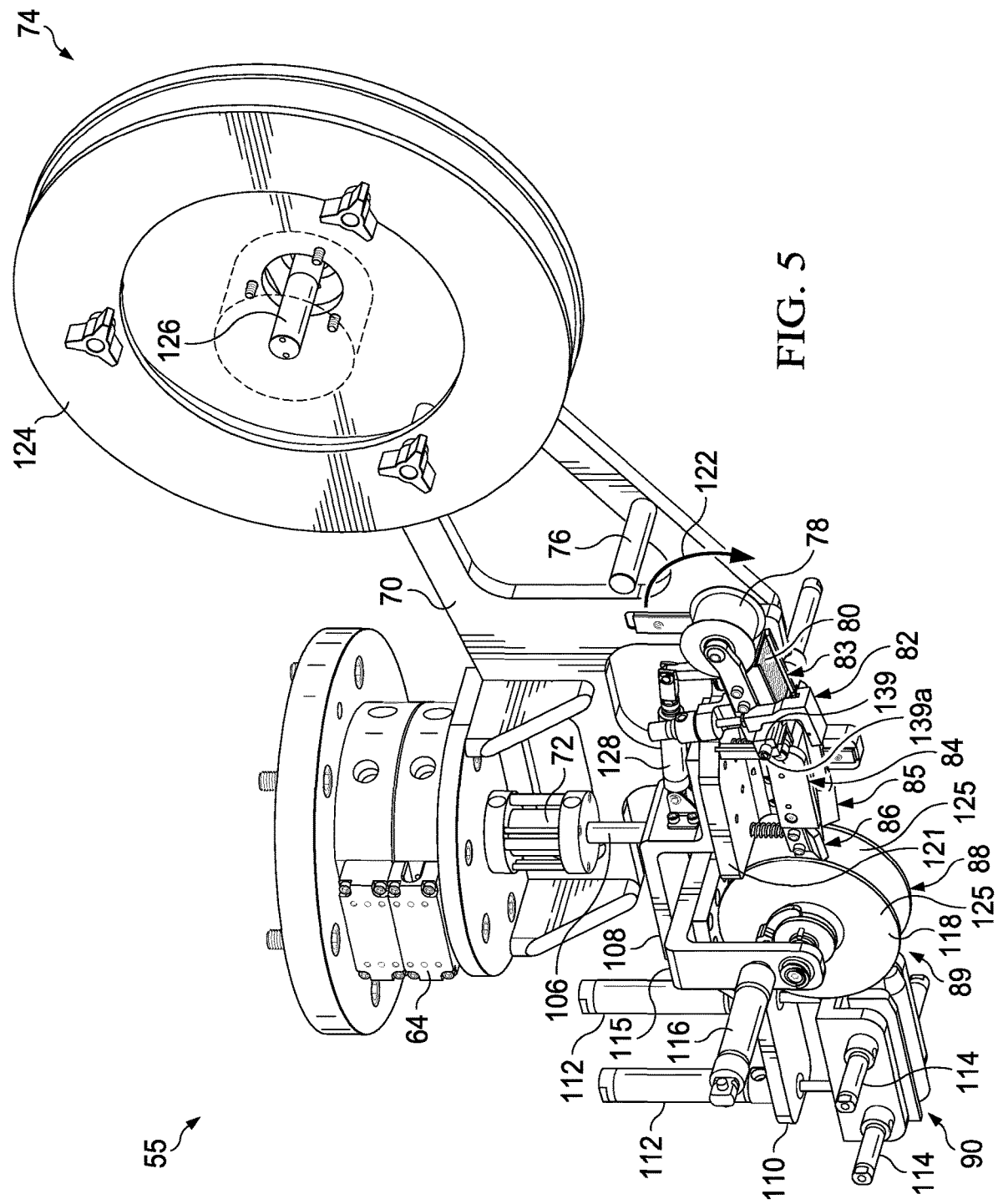
FIG. 5 is an illustration of a perspective view of one side of the end-effector, the material strip not shown for clarity.
Figure 6:
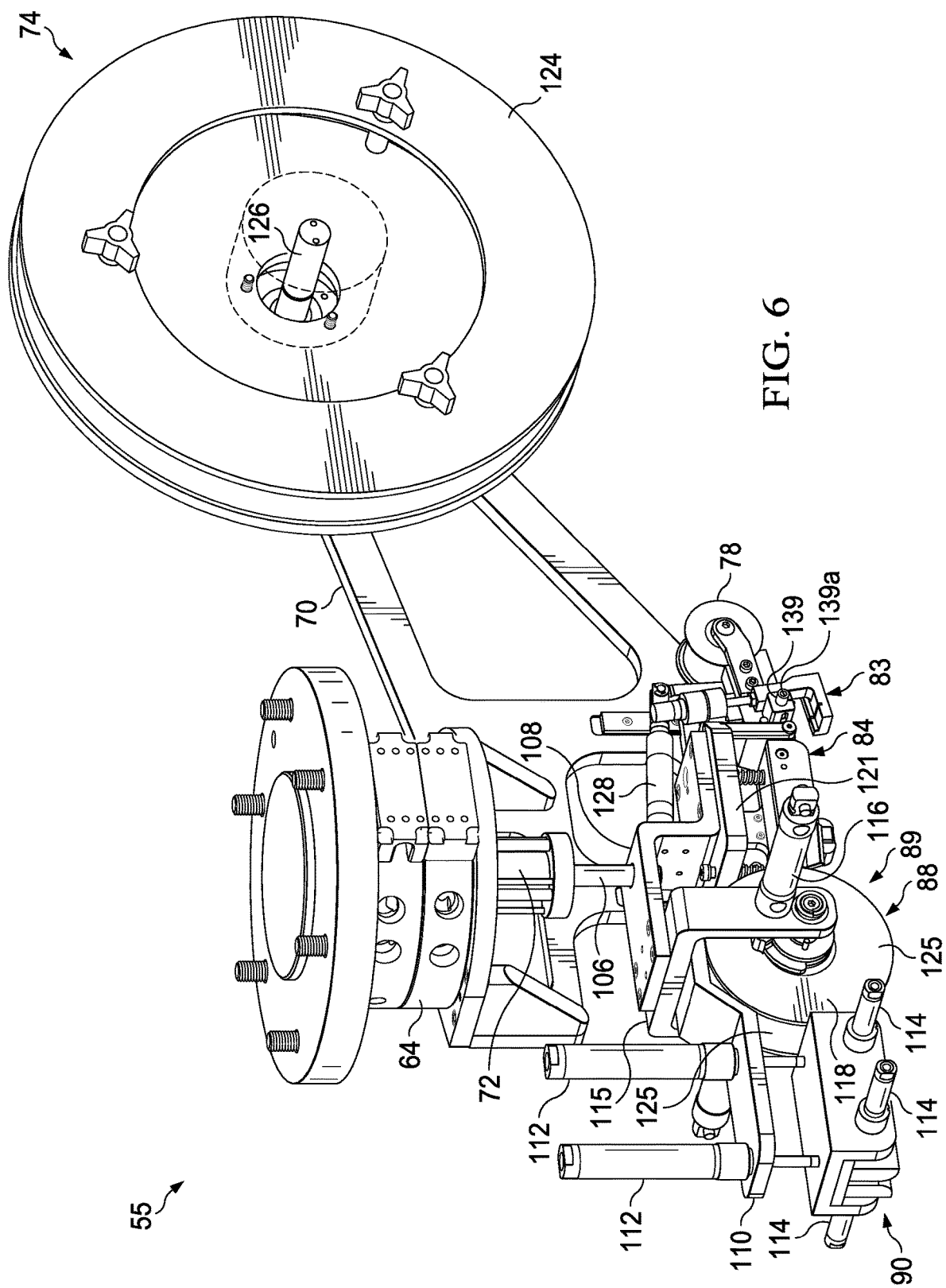
FIG. 6 is an illustration of a perspective view of the other side of the end-effector shown in FIG. 5.

Attention is now directed to FIGS. 5 and 6 which illustrate additional details of an end-effector 55 suitable for applying a material strip 56 to the edge 58 of the blade stringer 92 shown in FIG. 3. The spool assembly 74 is mounted on the forward end of the frame 70, and includes a spool-like reel 124 mounted for rotation on a hub 126 attached to the frame 70. The previously mentioned actuator 72 is mounted at the top of the frame 70 and may comprise a pneumatic or hydraulic cylinder having a downwardly extending piston rod 106 that is secured to a sub-frame 108. The sub-frame 108 is vertically displaceable by the actuator 72 relative to the frame 70, toward and away from the edge 58 of the stringer blade 94 (FIG. 3).

The conformance wheel assembly 89 includes a conformance wheel 118 mounted for rotation on a U-shaped yoke 115 that is secured to and extends downwardly from the sub-frame 108. As will be discussed below in more detail, a pair of actuators 116, which may be pneumatically or hydraulically operated by the controller (FIG. 2) are mounted on opposite sides of the yoke 115 and are coupled with the conformance wheel 118 for purposes that will be discussed later.

The guide roller 78, optional vacuum suction clamp 80, cutter assembly 82, compaction shoe 85 and the pre-shapers 86 are mounted on an angle bracket 121 that is secured to the sub-frame 108, forward of the conformance wheel assembly 89. The post compaction assembly 90 is mounted on a rear frame extension 110 that is also secured to the sub-frame 108. The optional heater may comprise any suitable device for heating the adhesive on the material strip 56 as it is drawn from the reel 124 immediately before wrapping around the guide roller 78. For example, and without limitation, in one embodiment, the heater 76 may comprise an electric heating coil and an air blower (both not shown) mounted on the frame 70, and oriented to blow warm air onto the adhesive side of the material strip 56. The applied heat activates the adhesive, thereby increasing the tack level of the material strip 56 and rendering it more formable immediately before it is brought into contact with the stringer blade 94. In other embodiments, the heater 76 may comprise an infrared heater, a laser heater or other suitable heaters.

Figure 7:
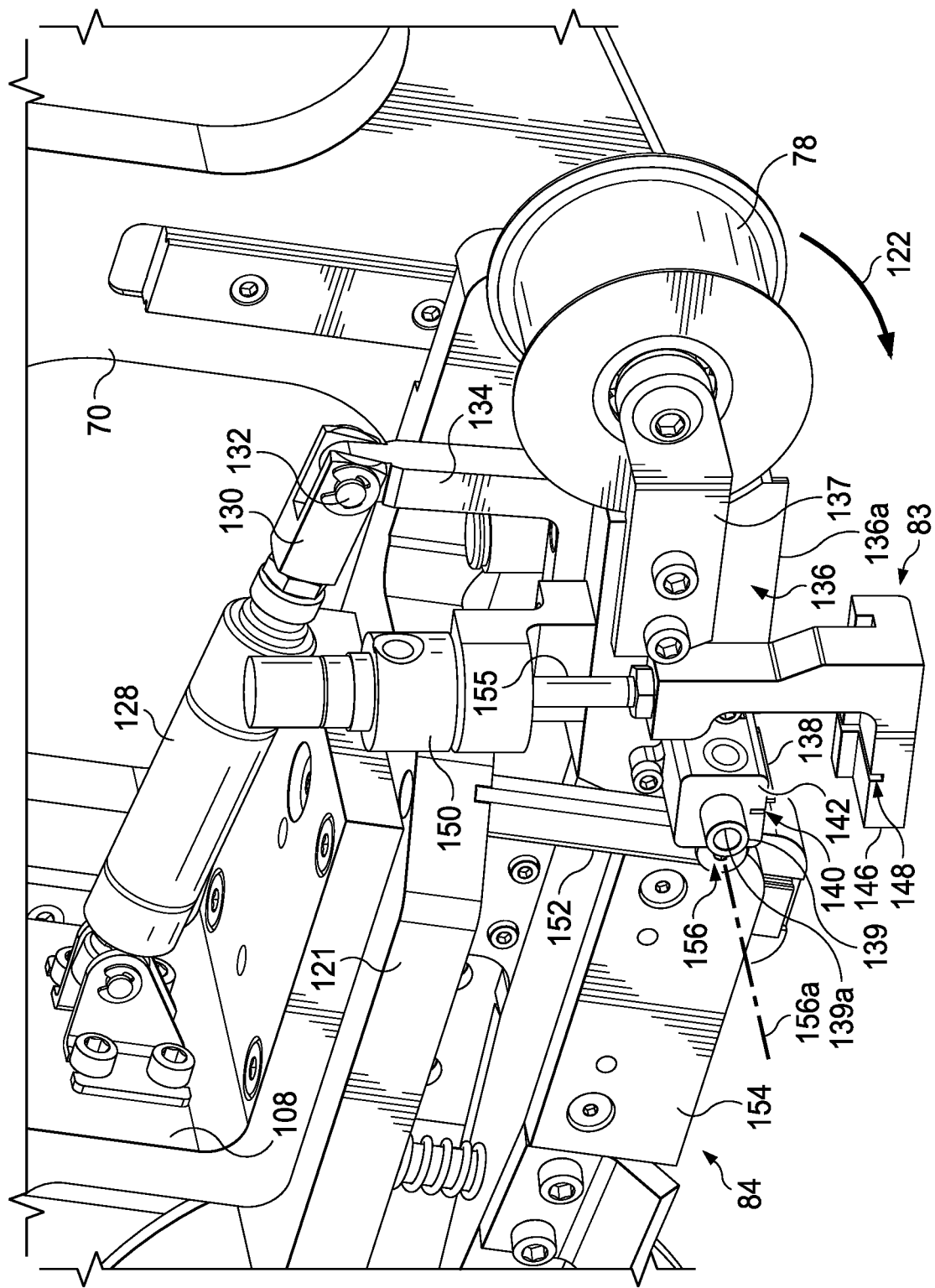
FIG. 7 is an illustration of an upper perspective view showing additional details of the guide roller and cutter assembly, the material strip not shown for clarity.

Referring now also to FIG. 7, the guide roller 78 is rotatably mounted on a pair of arms 137 that are secured to the forward end 136*a* of a pivot block 136. The pivot block pivots 122 from a raised standby position, to a lowered operative position in which the guide roller 78 guides and compresses the material strip 56 onto the top 60 of the blade 94. The pivot block 136 pivots on a shaft 156 about an axis of rotation 156*a*. The opposite ends of the shaft 156 are attached to a pivot bracket 152 and the frame 70. Pivoting of the pivot block 136 is effected by an actuator 128, which may be a pneumatic or hydraulic cylinder that is secured to the sub-frame 108 and is controlled by the controller 65 (FIG. 2). The actuator 128 is coupled with the pivot block 136 through a piston rod clevis 130 and pin 132 to an arm 134 secured to the pivot block 136.

The cutter assembly 82 includes a foot-like clamp 146 on the end of the piston rod 155 forming part of an actuator 150 that is mounted on the pivot block 136 and controlled by the controller 65 (FIG. 2). The clamp 146 includes a slot 148 therein to receive a cutter blade 138 mounted within a blade holder 142 that is attached to and extends beyond one side of the pivot block 136. In some embodiments, it may be necessary or desirable to cool the blade 138. Accordingly, the blade holder 142 may be provided with a chiller fitting 139 having a coupling 139*a* that is adapted to the connected with a pressurized source of cool air (not shown). The chiller fitting 139 includes an air outlet (not shown) that directs cool air along the length of the blade 138.

Figure 8:
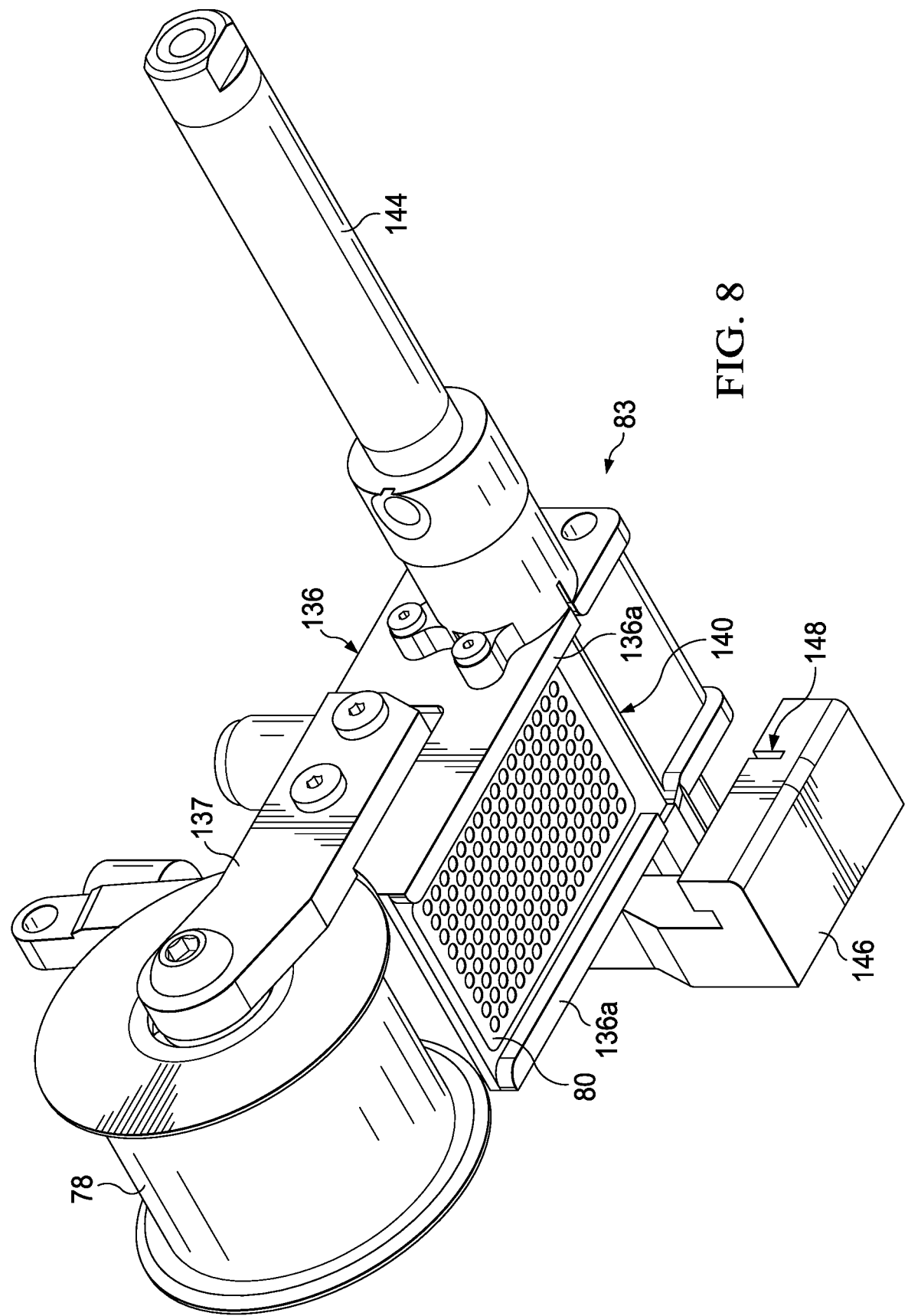
FIG. 8 is an illustration of a bottom perspective view of the guide roller and cutter assembly.
Figure 9:
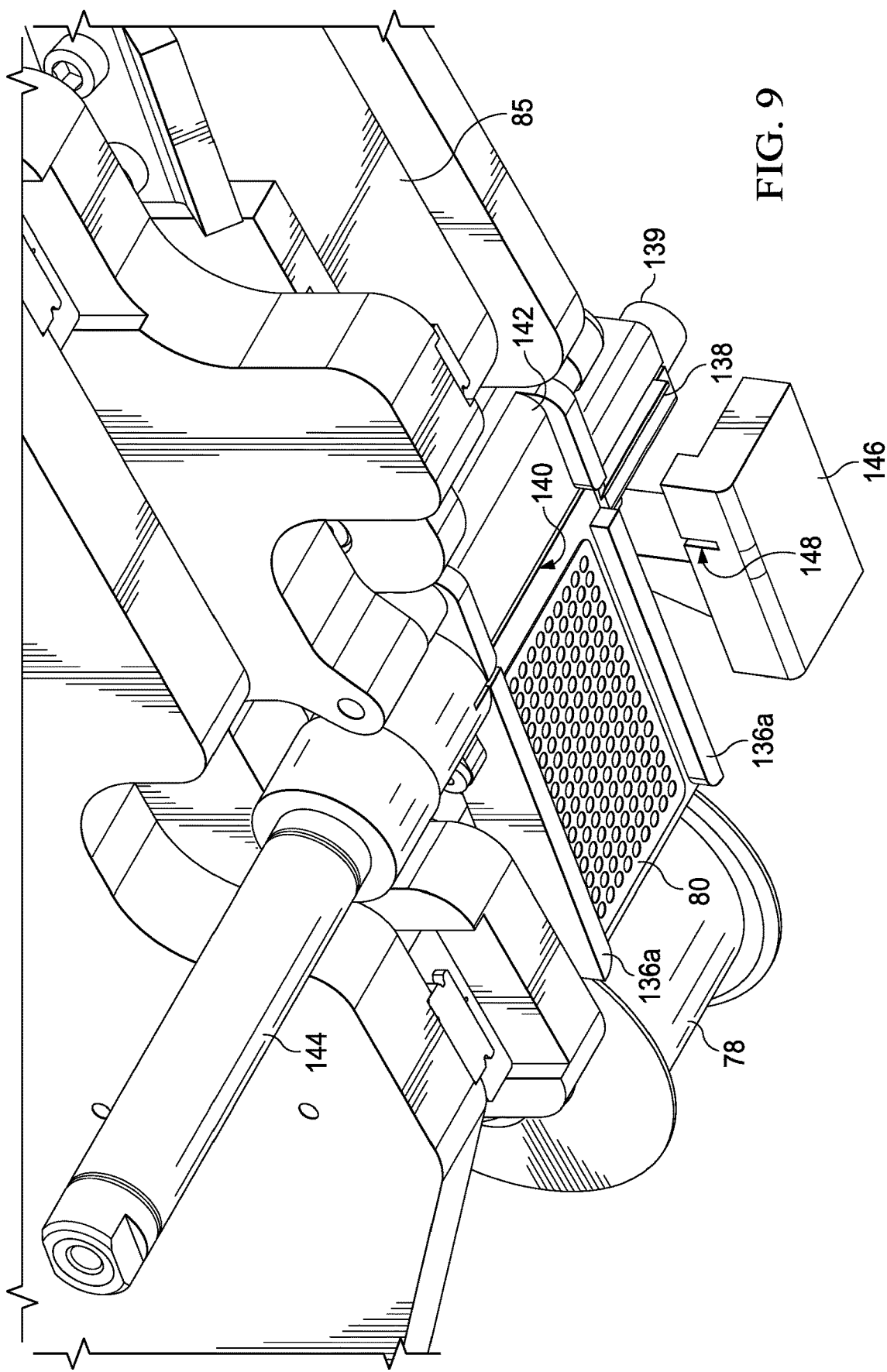
FIG. 9 is an illustration similar to FIG. 8 but showing further details of the vacuum suction clamp and cutter assembly.

Referring also now to FIGS. 8 and 9, the cutter blade 138 (FIG. 7) is drawn by an actuator 144, which may comprise a pneumatic or hydraulic cylinder operated by the controller 65 (FIG. 2), from its outboard position on the side of the pivot block 136 through a slot 140 that extends transversely through the blade holder 142, the clamp 146 and the pivot block 136. The actuator 144 draws the cutter blade 138 through the slot 148, transversely across and through the entire width "W" (FIG. 4) of the material strip 56 (FIG. 3), thereby severing the strip 56 at the end, or any point along the edge 58 of the stringer 92. Following a severing operation in which the material strip 56 is cut at a point along the length of the edge 58, the end effector 55 has the ability to recommence laying and forming the material strip 56 at one or more other locations along the length of the structure 54.

While a reciprocating type, straight cutter blade 138 that shears across the material strip 56 has been disclosed in connection with the illustrated embodiment, any of a variety of other types of cutters for severing the material strip 56 may be employed. For example, and without limitation, the cutter assembly 82 may employ a rotary cutter (not shown) that rolls across and cuts the material strip 56, or an ultrasonic cutter (not shown).

In order to better hold and position the material strip 56 during the cutting operation, the clamp 146 draws material strip 56 against the bottom (see FIG. 8) of the pivot block 136. Optionally, a vacuum suction clamp 80 integrated into the pivot block 136 may be provided immediately in front of the blade slot 140 in order to assist in holding the material strip 56 substantially flat against the bottom of the pivot block 136 during a cutting operation. The pivot block 136 may include a pair of downwardly extending lateral curbs 136*a* which engage the outer edges 56*a* of the material strip 56 in order to better transversely align the material strip 56 with the cutter blade 138.

Figure 10:
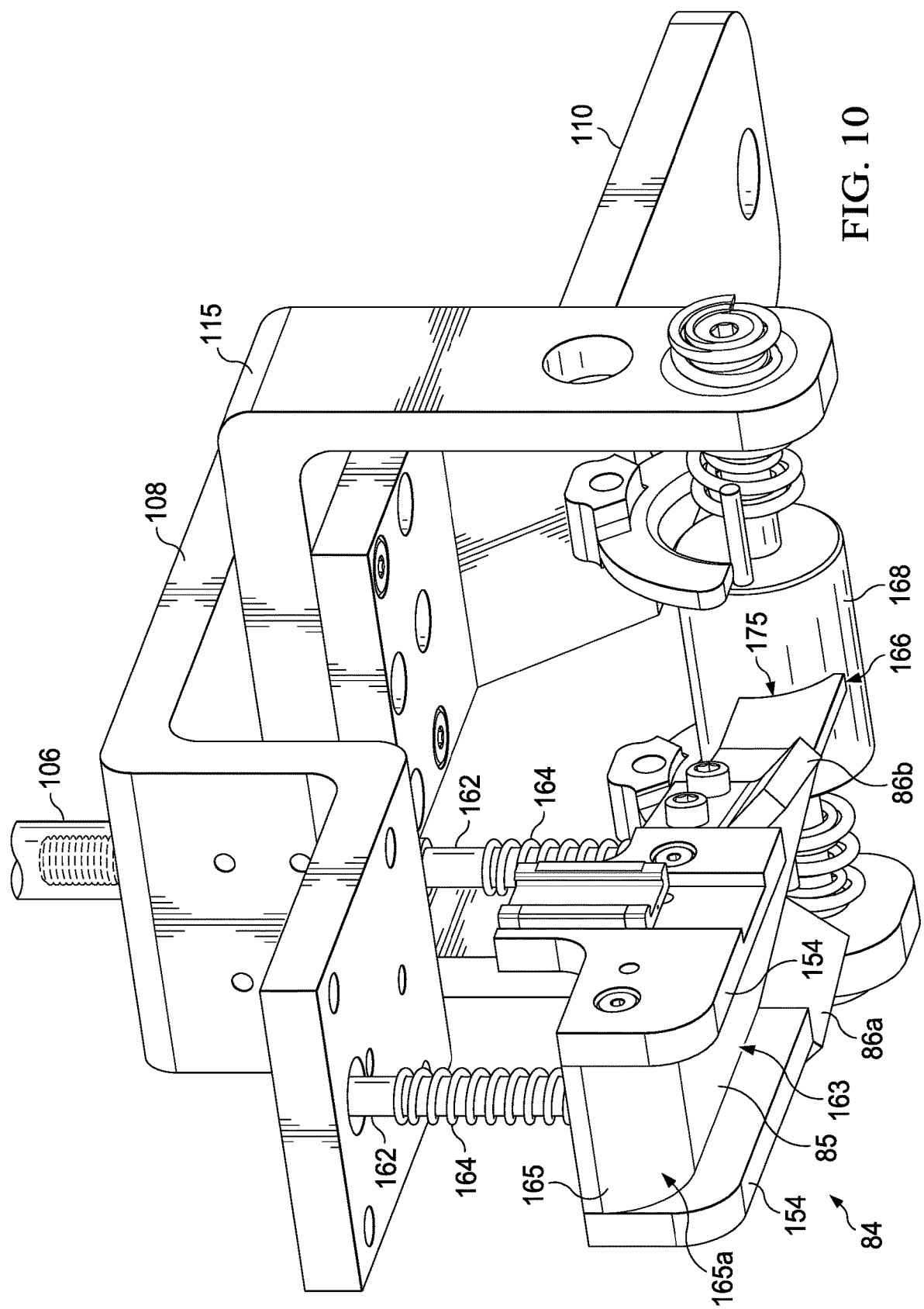
FIG. 10 is an illustration of a perspective view of one end of the compaction shoe assembly.
Figure 11:
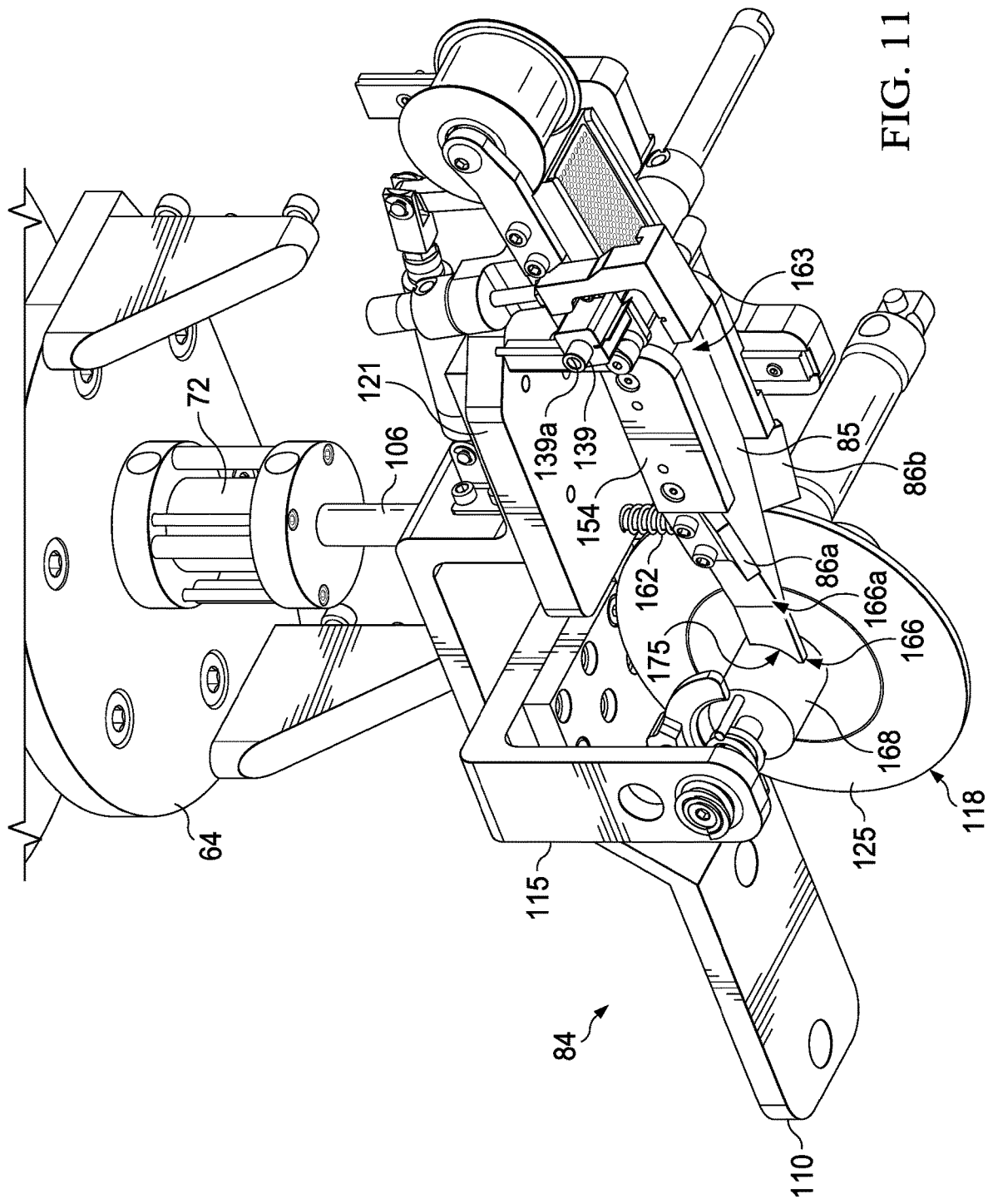
FIG. 11 is an illustration of a perspective view of the other end of the compaction shoe assembly.

FIGS. 10 and 11 illustrate additional details of the compaction shoe assembly 84, including the pre-shapers 86. The compaction shoe assembly 84 is provided with a spring-loaded suspension mounting arrangement that allows compliant movement of the elongate compaction shoe 85 along the edge 58, while biasing a flat bottom surface 163 of the compaction shoe 85 into engagement with the edge 58 with a preselected, substantially constant level of compaction force. The compaction shoe assembly 84 comprises an elongate shoe 85 secured to a pair of longitudinally spaced dowels 162 that are slidably received in the angle bracket 121. Compression springs 164 sleeved over the dowels 162 bias the shoe 85 downwardly, causing the flat bottom surface 163 of the shoe 85 to compact the material strip 56 against the top of the edge 58 with a pre-selected amount of compaction force.

The forward end 165 of the shoe 85 is rounded 165*a* (see FIG. 10) to assist in smoothly feeding the material strip 56 beneath the shoe 85. A pair of guide plates 154 mounted on opposite sides of the flat bottom surface 163 shoe 85 align and guide the material strip 56 as it passes beneath the shoe 85. The aft end 166 of the shoe 85 is rearwardly tapered at 166*a* and terminates in an arcuate edge 175 that substantially matches the curvature of a hub 168 forming part of the conformance wheel 118 discussed below. Each of the pre-shapers 86 is secured to the aft end of the compaction shoe 85 and includes a shaping face 86*a* and 86*b* that is angled both downwardly and tapered inwardly relative to the direction of travel 52 (FIG. 1) of the material strip 56. Consequently, as the material strip 56 moves through the pre-shapers 86, the angled shaping faces 86*a* and 86*b* narrow and partially fold the outer edges 56*a* (FIG. 4) of material strip 56 down toward the sides 62 of the blade 94. It should be noted here that, while a sliding type shoe 85 has been illustrated, other compaction mechanisms are possible. For example, and without limitation, the compaction assembly 84 may employ a rolling type mechanism (not shown) to compact the material strip 56 against the edge 58.

Figure 12:
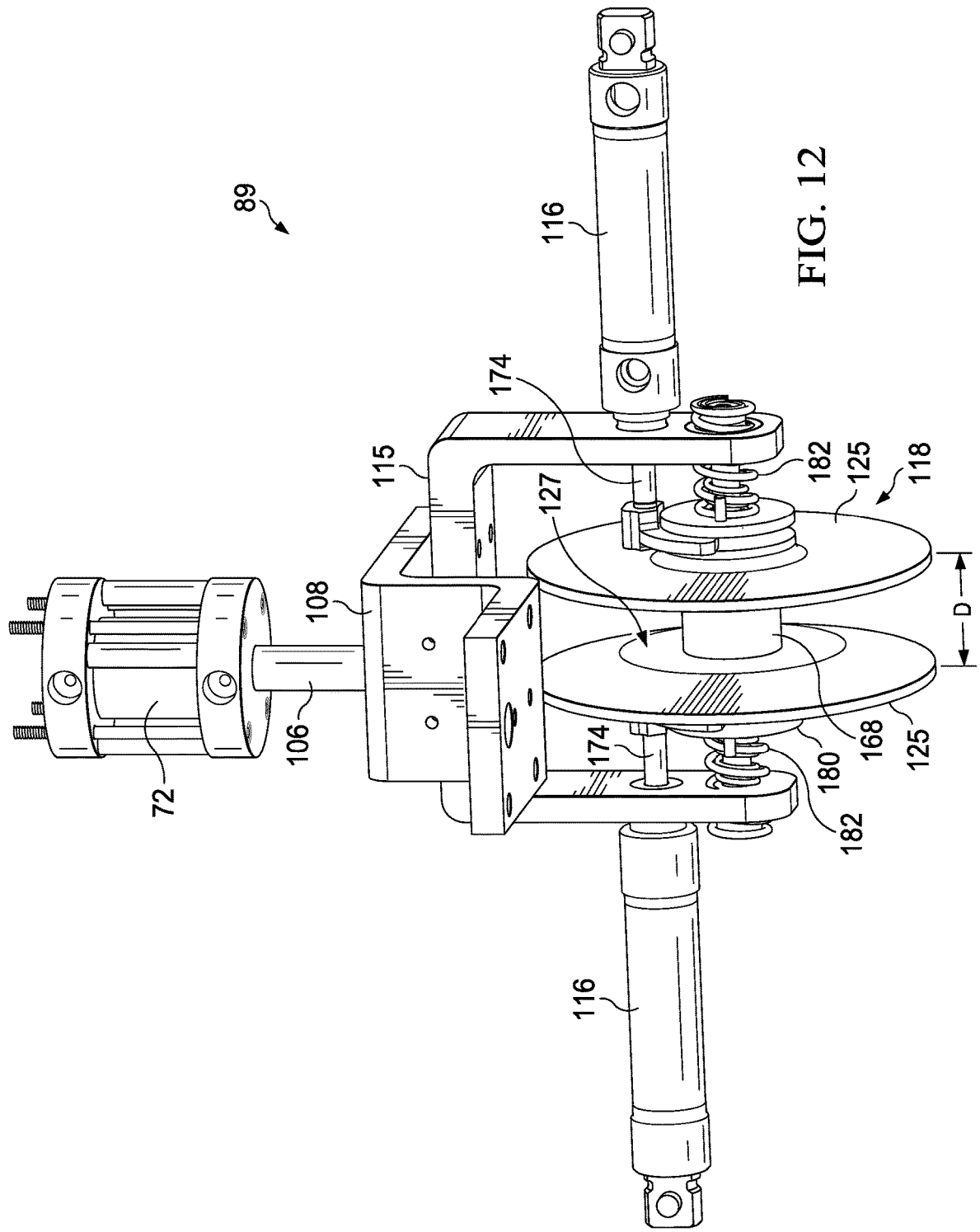
FIG. 12 is an illustration of a perspective view of the conformance wheel assembly.
Figure 13:
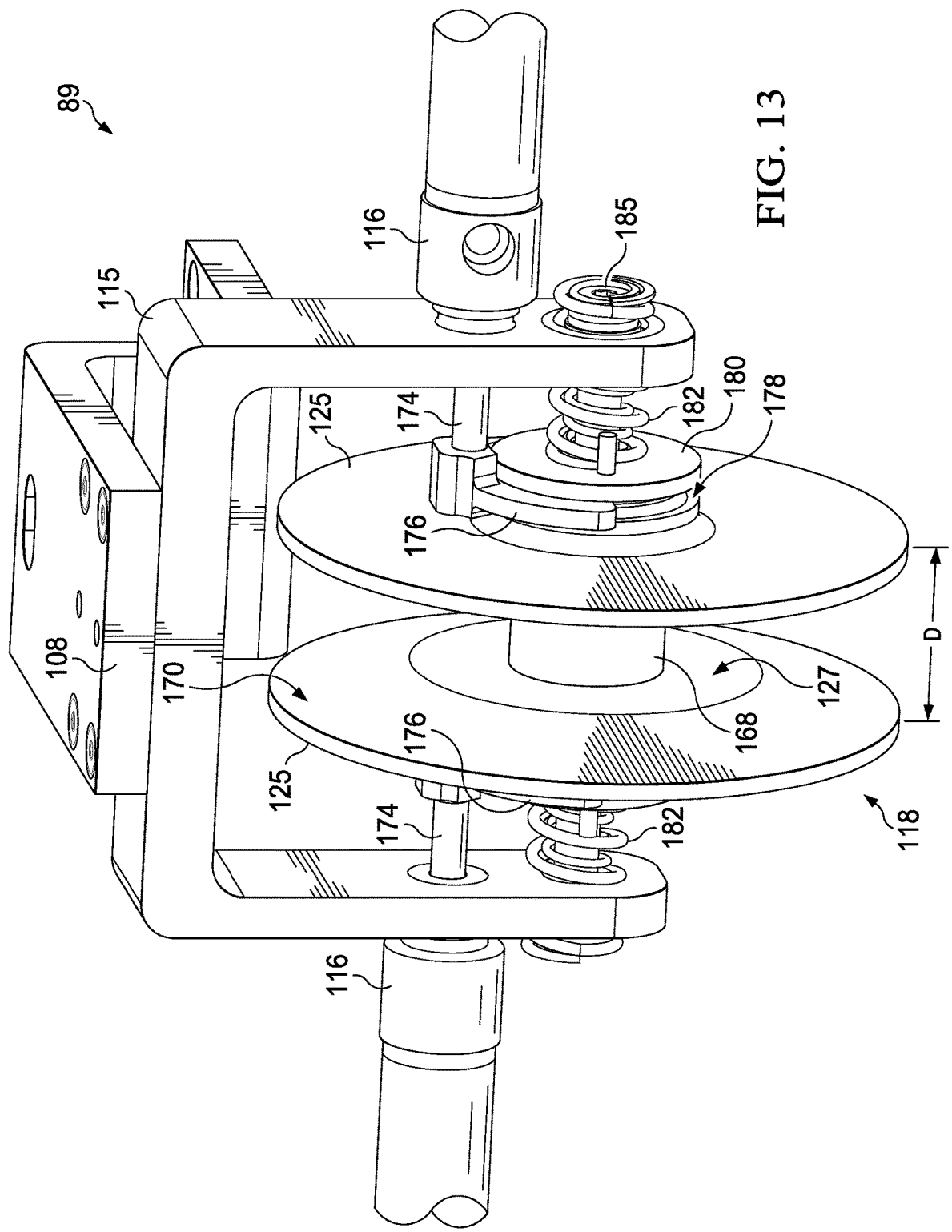
FIG. 13 is an illustration of an enlarged perspective view of the conformance wheel assembly shown in FIG. 12.

Attention is now directed to FIGS. 12 and 13 which illustrate additional details of the conformance wheel assembly 89. The conformance wheel 118 comprises a pair of laterally spaced apart conformance discs 125 that may be formed of polished UHDPE (Ultra High Density Polyethylene), or a range of other similar materials. The conformance discs 125 are rotatably mounted on a central hub 168 carried on an axle 185 (FIG. 13). Each of the conformance discs 125 includes a circumferential, chamfered face 170 at the outer periphery thereof, and a substantially flat compaction face 127 inboard of the chamfered face 170, immediately surrounding the hub 168. Each of the conformance discs 125 also includes an outer boss 180 provided with a circumferential slot 178.

A pair of actuators 116, which may be hydraulic or pneumatic cylinders operated by the controller 65 (FIG. 2), are mounted on the U-shaped yoke 115 and each has a piston rod 174 extending through the yoke 115 toward one of the discs 125. Arcuate fingers 176 attached to the outer ends of the piston rod 174 are received within the slots 178, thereby connecting the actuators 116 with the discs 125. Compression springs 182 sleeved over opposite ends of the axle 185 normally bias the conformance discs 125 to slide toward each other over the hub 168, such that the distance "D" between the two discs 125 is less than the width "W" (FIG. 4) of the material strip 56. When actuated, however, the actuators 116 overcome the force applied by the springs 182, causing the conformance discs 125 to be drawn outwardly away from each other, increasing the distance "D" between the discs 125.

Figure 14:
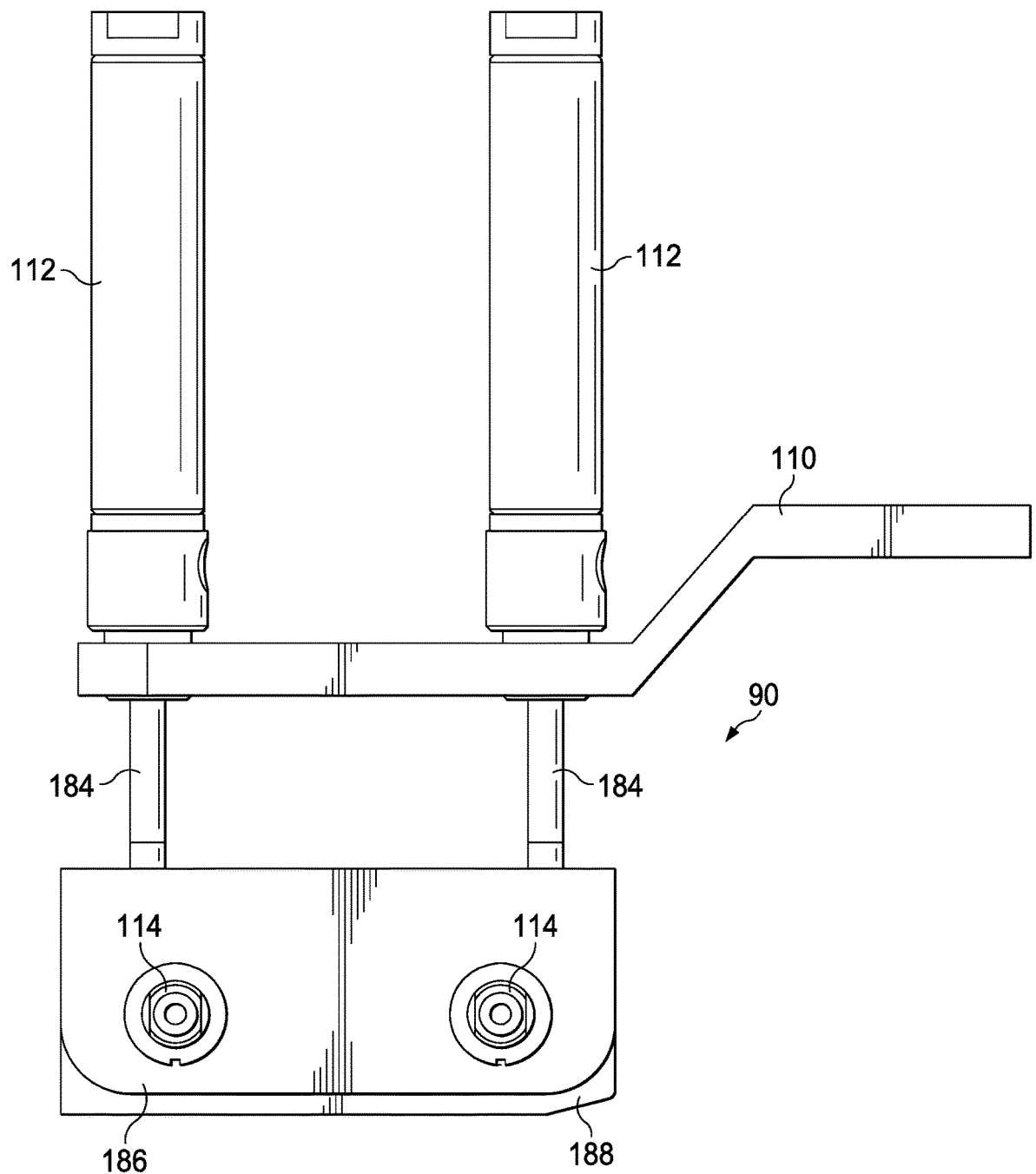
FIG. 14 is an illustration of a side view of the post compaction assembly.
Figure 15:
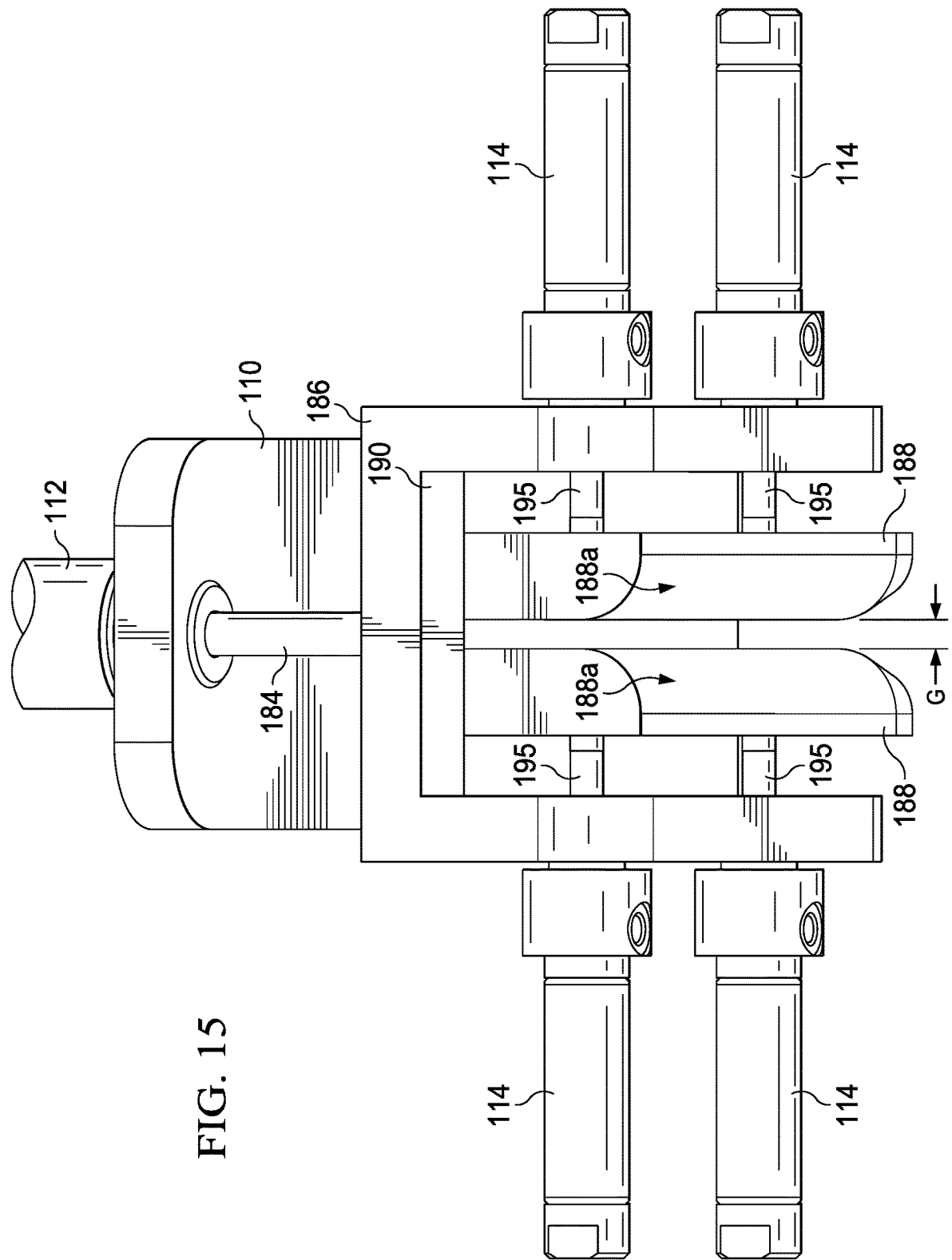
FIG. 15 is an illustration of a lower, rear view of the post compaction assembly shown in FIG. 14.
Figure 16:
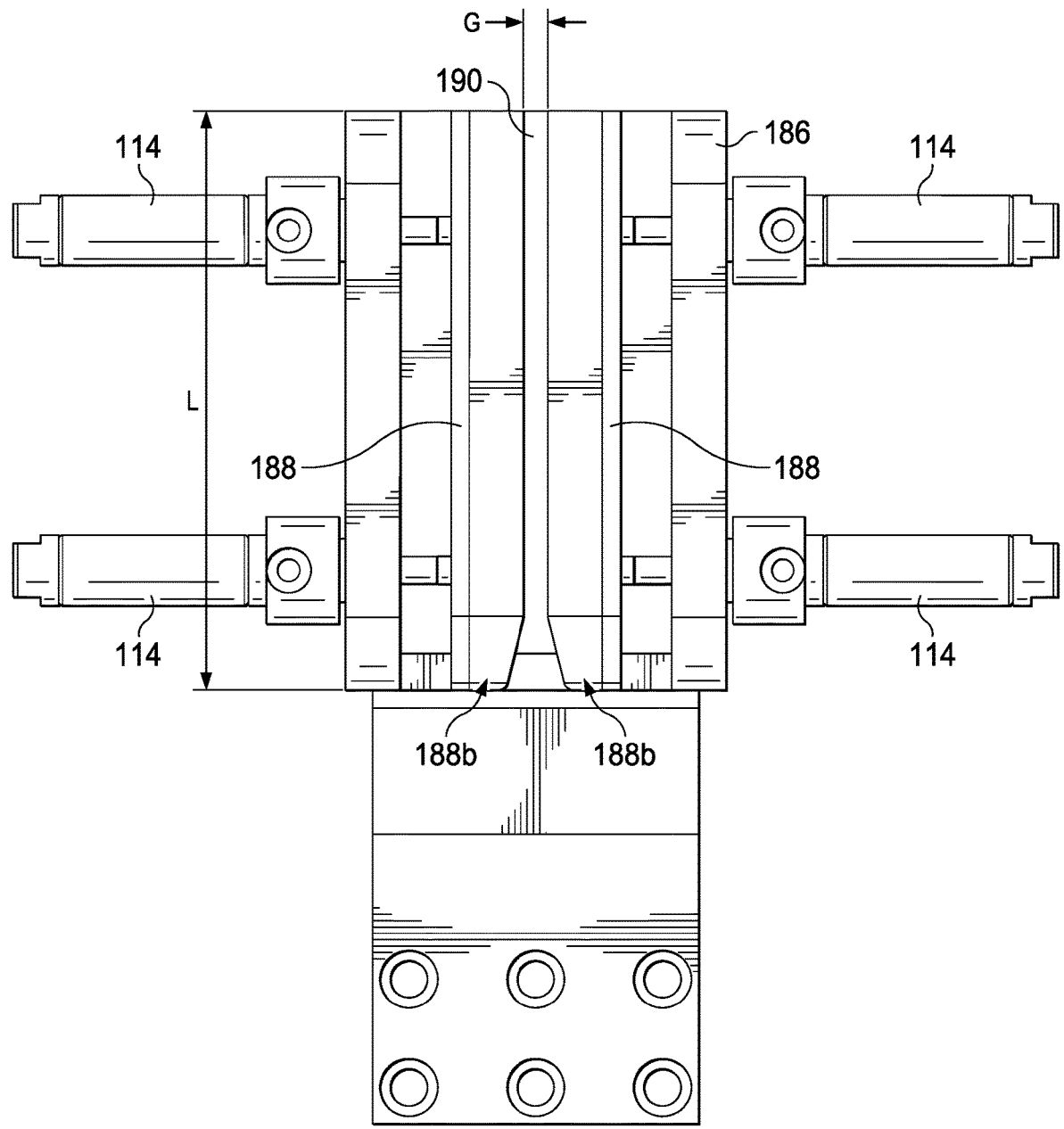
FIG. 16 is an illustration of a bottom plan view of the post compaction assembly shown in FIGS. 14 and 15.

Referring now to FIGS. 14, 15 and 16, the post compaction assembly 90 comprises a pair of laterally spaced apart, elongate compaction shoes 188 mounted inside a frame 186 having a generally U-shaped cross-section. The lower edges 188*a* as well as the leading edges 188*b* of the compaction shoes 188 are each rounded to better slide over the edge 58 of the blade 94. While compaction shoes 188 are illustrated in the exemplary embodiment, a roller type mechanism (not shown) may be employed having rollers that roll over and compact the material strip 56 against the sides 62 of the edge 58. Two pairs of actuators 114, which may comprise hydraulic or pneumatic cylinders operated by the controller 65 (FIG. 2), are mounted on the frame 186 and have output piston rods 195 that are connected to the compaction shoes 188. The piston rods 195 are normally retracted a distance sufficient to allow the edge 58 of the blade 94 to pass through the gap "G" between the compaction shoes 188. However, when actuated, the actuators 114 force the compaction shoes 188 into engagement with the areas of the material strip 56 that overlie the sides 62 of the edge 58, and apply lateral force that further compacts the material strip 56 against the sides 62 of the blade 94.

The frame 186 along with the compaction shoes 188 and the actuators 114 are attached to the ends of piston rods 184 of two actuators 112 that are mounted on the rear frame extension 110. The actuators 112 are operated by the controller 65 (FIG. 2) and move the post compaction assembly 90 vertically from a raised, standby position above the blade 94, to a lowered operative position (shown in FIG. 1) in which the compaction shoes 188 straddle the blade 94. It should be noted here that while the exemplary embodiment employs compaction shoes 188 that slidably engage the edges 58 of the blade 94, other types of post compaction devices are possible, including, without limitation, rollers (not shown) that press against and roll along areas of the material strip 56 that overlie the sides 62 of the edges 58.

A layer 190 of compliant material, such as without limitation, a compressible foam coated with a low friction durable material such as UHDPE (Ultra High Density Polyethylene), is located above the compaction shoes 188 and slidably engages the top 60 of the edge 58 as the end-effector 55 moves along the blade 94. The layer 190 of compliant material allows the post compaction assembly 90 to ride along the top 60 of the blade 94 while further compacting the material strip 56 and conforming to any unevenness on the top 60 of the edge 58 or structure contour or twist. In other embodiments, in lieu of the layer 190 of compliant material, it may be possible to employ a roller (not shown) that rolls over the top 60 of the edge 58.

Referring to FIG. 1-6, in use, under digital control by the controller 65 (FIG. 2), the manipulator (FIG. 2) positions the end-effector 55 at one end of the stringer 92, aligned with the blade 94. The material strip 56 is indexed to the slot 140 (FIGS. 7-9) in the cutter assembly 82 and held in place by the clamp 146. The guide roller and cutter assembly 83 is initially in its raised, standby position at this point. Similarly, the post compaction assembly 90 is in a raised position, while the discs 125 of the conformance wheel 118 are spread apart to accommodate entry of the stringer blade 94 into a conformance wheel assembly 89. The manipulator moves the end-effector 55 forwardly, partially onto the stringer blade 94. The actuator 72 then lowers the sub-frame 108, bringing the compaction shoe 85 into engagement with the top 60 of the stringer blade 94. Once the compaction shoe 85 is in contact with the top 60 of the stringer blade 94, the clamp 146 releases the material strip 56. The guide roller and cutter assembly 83 is then pivoted downwardly into contact with the top 60 of the edge 58.

The manipulator 66 then incrementally advances the end-effector 55 along the stringer blade 94, until the conformance wheel 118 moves onto the blade 94 and the conformance discs 125 (FIGS. 12 and 13) straddle the blade 94. At this point, the actuators 116 release the discs 125, allowing the springs 182 to force the discs 125 into engagement with the outer edges 56*a* (FIG. 4) of the material strip 56 and the sides 62 of the blade 94. The spring force applied to the material strip 56 by the discs 125 fully folds the outer edges 56*a* of the pre-shaped material strip 56 against the sides 62 of the blade 94. Further incremental advancement of the end-effector 55 positions the post compaction assembly over the blade 94. The actuators 112 lower the compaction shoes 188 (FIGS. 14-16) respectively down onto opposite sides of the stringer blade 94, following which actuators 114 press the compaction shoes 188 into engagement with the sides 62 of the stringer blade 94, applying a compaction force that further compacts the outer edges 56*a* of the material strip against the sides 62.

With the end-effector 55 now fully engaged with the stringer blade 94, the manipulator 66 advances the end-effector 55 along the stringer blade 94 at a preselected rate determined by the controller 65. The controller 65 causes the manipulator 66 to adjust the position and movement of the end-effector 55 to track any curvatures, twists and rotation in contour or undulations in the stringer blade 94. In other embodiments, a laser displacement sensor (not shown) or similar device connected in a feedback loop to the controller 65 may be employed to automatically adjust the position of the end effector 55 to any curvatures, twists and rotation in contour or undulations in the stringer blade 94. In still other embodiments, the end effector may comprise a completely passive system that does not require any automatic controls, and which self-centers itself on the stringer blade 94 using a self-centering springs (not shown).

As the end-effector 55 moves along the stringer blade 94, the material strip 56 adheres to the stringer blade 94. Because the material strip 56 adheres to the stringer blade 94, forward movement of the end-effector 55 along the stringer blade 94 causes the material strip to be pulled from the spool and fed to the guide roller 78. Substantially constant tension in the material strip 56 is maintained due to the forward movement of the end-effector 55 while the just-placed portion of the material strip 56 adheres to the stringer blade 94. Additionally, the spool assembly 74 may employ an integrated tension controller that applies tension to the material strip 56 as it is unwound from the spool-like reel 124. As the end-effector 55 moves along the stringer blade 94, the guide roller 78 guides the material strip 56 beneath the pivot block 136, past the cutter assembly 82 to the compaction shoe assembly 84.

The material strip 56 then moves beneath the compaction shoe 85 (FIGS. 10 and 11) which compacts the material strip 56 onto the top 60 of the edge 58 with a compaction force that is determined by the force applied by the springs 164. The guide plates 154 maintain the transverse alignment of the material strip 56 as it moves beneath the compaction shoe 85. The outer edges 56*a* of the material strip 56 then engage the pair of pre-shapers 86 which slidably engage and deflect the outer edges 56*a* of the material strip 56 such that they partially fold down and over the sides 62 of the blade 94. The tapered aft end 166 of the compaction shoe 85 maintains contact with the top 60 of the blade 94 as the partially folded material strip 56 begins to engage the chamfered faces 170 (FIGS. 12 and 13) on the conformance discs 125 that form part of the conformance wheel 118. The chamfered faces 170 continue folding the outer edges 56a of the material strip 56 toward the sides 62 of the blade 94. As the material strip 56 continues moving through the conformance wheel 118, the flat compaction faces 127 fully conform and compact the outer edges 56a against the sides 62 of the blade 94 with a compaction force that is determined by the force applied by the springs 182.

As the end effector continues its path along the stringer 92, the post compaction assembly 90 (FIGS. 14-16) engages the material strip 56 on the stringer blade 94 through the gap "G" between the compaction shoes 188. The compaction shoes 188 compact the outer edges 56a of the material strip 56 against the sides 62 of the blade 94 with a force that is determined by the actuators 114 (or alternatively, springs). The dwell-time of the material strip 56 between the compaction shoes 188 is determined by the length "L" of the compaction shoes 188. As previously mentioned, the material strip 56 on the top of the stringer blade 94 engages the layer 190 of conformal material located immediately above the compaction shoes 188, which further compacts the material strip 56 against the top 60 of the stringer blade 94.

Referring particularly now to FIGS. 7, 8 and 9, when the end-effector 55 has placed and compacted the material strip 56 along the entire length of the stringer blade 94 and reaches the end of the stringer 92, or at any point along the length of the Stringer 92, the cutter assembly 82 cuts the material strip 56. Referring particularly to FIGS. 8 and 9, when the end-effector 55 reaches the end of the stringer blade 94, or any point along the stringer blade 94, the end-effector 55 pauses in its travel, and the actuator 150 causes the clamp 146 to move upwardly and clamp the material strip 56 between the foot 146 and the pivot block 136. Vacuum is applied to the optional suction clamp 80, causing the material strip 56 to be drawn flat and clamped against the pivot block 136 in preparation for severing the material strip 56.

With the end-effector 55 remaining stationary, the material strip 56 clamped against the pivot block 136, and using the optional vacuum clamp 80 to hold the material strip 56 flat, the actuator 144 draws the cutter blade 138 (FIG. 9) transversely through the material strip 56, thereby severing the strip 56. As previously mentioned, other cutter mechanisms such as a rotary cutter (not shown) maybe employed to cut the material strip 56. With the just-placed material strip 56 severed, the end-effector 55 may traverse to another point along the stringer 92 where the material strip 56 is required, or traverse the rest of the way past the end of the stringer 92.

Figure 17:
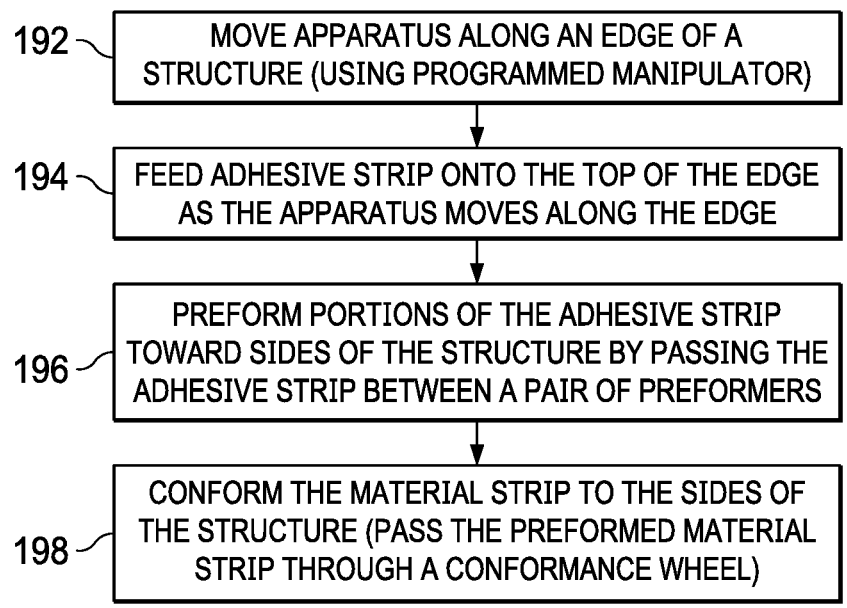
FIG. 17 is an illustration of a flow diagram of a method of applying an adhesive material strip along an edge of a structure.

FIG. 17 broadly illustrates the overall steps of a method of applying an adhesive material strip 56 along an edge 58 of a structure 54. Beginning at 192, an end-effector 55 is moved along the edge 58 of the structure 54 using, for example, a programmed manipulator such as a robot (not shown). At 194, an adhesive material strip 56 is fed onto the top of the edge 58, as the end-effector 55 moves along the edge 58. At 196, portions of the adhesive strip 56 are pre-shaped toward the sides 62 of the structure 54 by passing the adhesive material strip 56 between a pair of pre-shapers 86 on the end-effector 55. At 198, the adhesive material strip 56 is conformed to the sides 62 of the structure 54 by passing the pre-shaped adhesive material strip 56 through a conformer 88. Then, the material strip 56 is severed using a suitable cutting mechanism as described previously.

Figure 18:
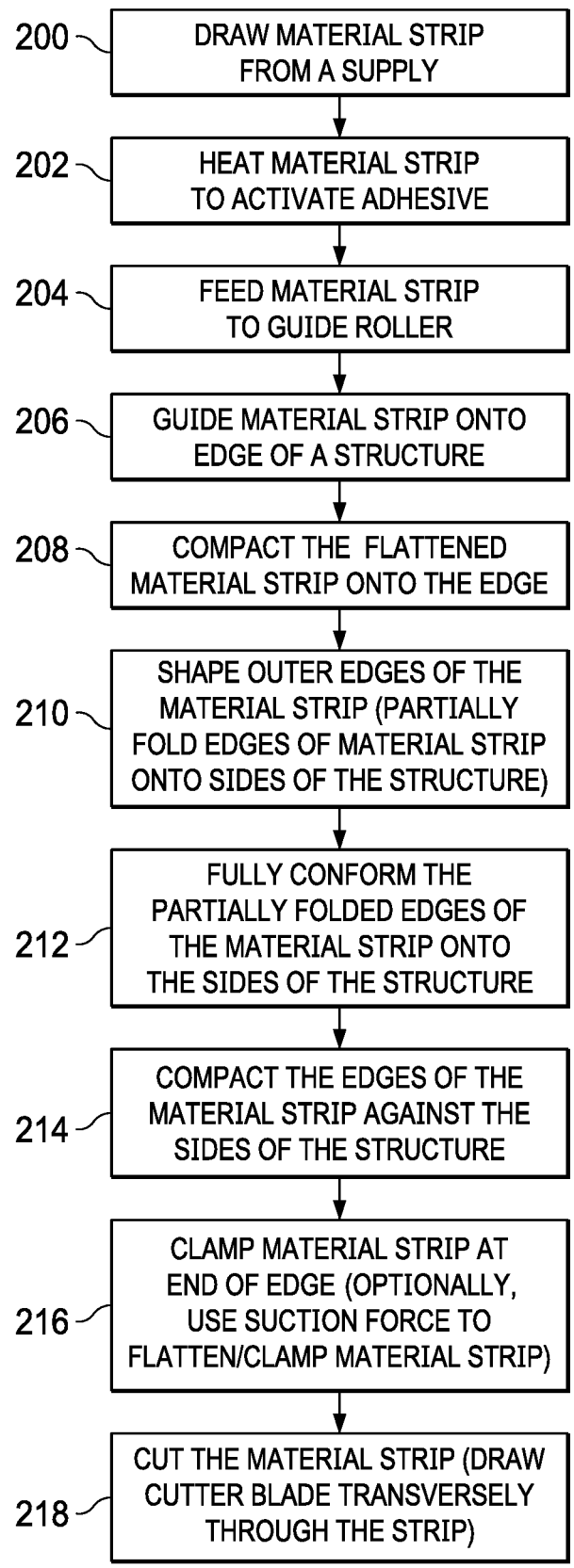
FIG. 18 is an illustration of a flow diagram showing how the material strip is placed, folded and compacted by the end-effector.

Attention is now directed to FIG. 18 which illustrates how the material strip 56 is processed by the end-effector 55. Beginning at 200, the material strip 56 is drawn from a supply thereof which, in the illustrated example, comprises the spool assembly 74. At 202, the material strip 56 is heated, thereby increasing the tack level of the adhesive 102c on the strip 56. At 204, the material strip 56 is fed to a guide roller 78 which, at 206, guides the material strip 56 onto the edge 58 of a structure 54 such as the stringer blade 94. At 208, the flattened material strip 56 is compacted onto the edge 58 of the structure 54. At 210, the outer edges 56a of the material strip 56 are shaped, by partially folding them onto the sides 62 of the structure 54. At 212, the partially folded edges 56a of the material strip 56 are fully conformed onto the sides 62 of the structure 54. At 214, the edges 56a of the material strip are compacted against the sides 62 of the structure 54. When the end-effector 55 reaches the end of the edge 58, or at a point along the structure 54, the material strip 56 is clamped at 218, and optionally suction force is used to flatten and assist in clamping the material strip. After having been clamped at 216, the material strip is cut at 218 by drawing a cutter blade 138 transversely through the strip 56, or using an alternate cutter mechanism.

Figure 19:
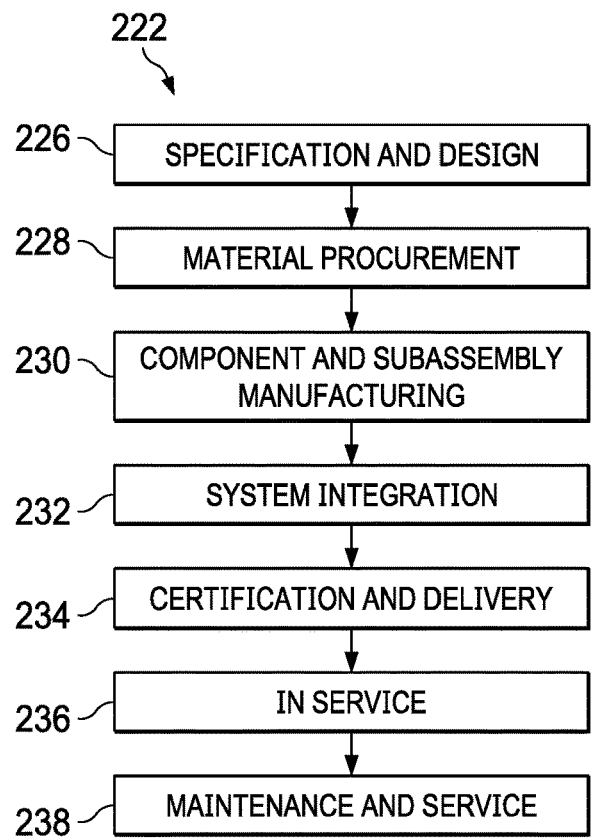
FIG. 19 is an illustration of a flow diagram of aircraft production and service methodology.
Figure 20:
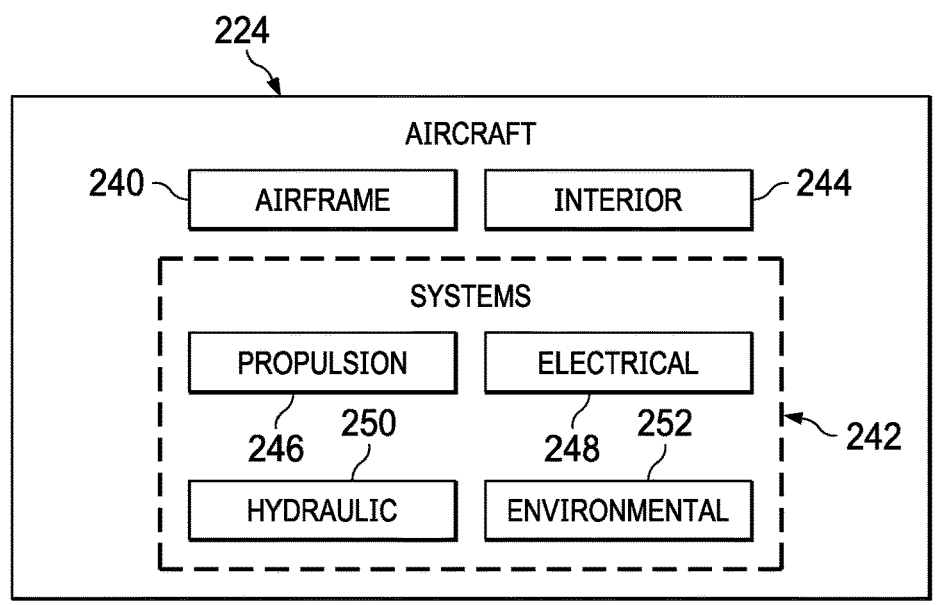
FIG. 20 is an illustration of a block diagram of an aircraft.

Embodiments of the disclosure may find use in a variety of potential applications, particularly in the transportation industry, including for example, aerospace, marine, automotive applications and other application where elongate structural members, such as stringers, spars and beams, may be used. Thus, referring now to FIGS. 19 and 20, embodiments of the disclosure may be used in the context of an aircraft manufacturing and service method 222 as shown in FIG. 19 and an aircraft 224 as shown in FIG. 20. Aircraft applications of the disclosed embodiments may include, for example, without limitation, the edges of stringers, spars and beams, to name only a few. During pre-production, exemplary method 222 may include specification and design 226 of the aircraft 222 and material procurement 228. During production, component and subassembly manufacturing 230 and system integration 232 of the aircraft 222 takes place. The embodiments maybe employed to apply material strips to the edges of structural subassembly components manufactured at 230, and integrated with other components at 232. Thereafter, the aircraft 222 may go through certification and delivery 234 in order to be placed in service 236. While in service 236 by a customer, the aircraft 222 is scheduled for routine maintenance and service 238, which may also include modification, reconfiguration, refurbishment, and so on.

Each of the processes of method 222 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 20, the aircraft 224 produced by exemplary method 222 may include an airframe 240 with a plurality of systems 242 and an interior 244. Examples of high-level systems 242 include one or more of a propulsion system 246, an electrical system 248, a hydraulic system 250 and an environmental system 252. Any number of other systems may be included. The disclosed embodiments may be employed to apply material strips to edges of a variety of structural components forming part of the airframe 240. Although an aerospace example is shown, the principles of the disclosure may be applied to other industries, such as the marine and automotive industries.

Systems and methods embodied herein may be employed during any one or more of the stages of the production and service method 222. For example, components or subassemblies corresponding to production process 230 may be fabricated or manufactured in a manner similar to components or subassemblies produced while the aircraft 224 is in service 236. Also, one or more apparatus embodiments, method embodiments, or a combination thereof may be utilized during the production stages 230 and 232, for example, by substantially expediting assembly of or reducing the cost of an aircraft 224. Similarly, one or more of apparatus embodiments, method embodiments, or a combination thereof may be utilized while the aircraft 224 is in service, for example and without limitation, to maintenance and service 238.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus configured to apply a strip of material along an edge of a structure, wherein the edge of the structure comprises a top and first and second sides, the apparatus comprising:
   an end effector connected to a manipulator configured to move the end effector along a length of the edge of the structure and follow any: curves, twists, contours, rotations in contour, or undulations, along the edge of the structure and maintain a center of a width of the strip of material aligned with a centerline of the edge of the structure as the end effector traverses a length of the structure;
   the end effector comprising:
      an actuator that connects a sub-frame to a frame;
      a spool connected to a front end of the frame and configured to hold the strip of material;
      a guide roller mounted on a pair of arms secured to a forward end of a pivot block and configured to guide and compress the strip of material from the spool onto the edge of the structure, the pivot block configured to pivot about a shaft attached between a pivot bracket and the frame;
      a cutter assembly comprising a cutter configured to cut the strip of material;
      a compaction shoe on the sub-frame configured to compact the strip of material onto the top of the edge of the structure; and
      a pre-shaper on the sub-frame comprising a shaping face configured to partially shape the strip of material down onto the first and second sides of the edge of the structure.

2. The apparatus of claim 1, the end effector further comprising:
   a conformer configured to conform the strip of material onto the first and second sides of the edge of the structure;
   the pivot block configured to pivot responsive to an extension, toward the front end of the frame; and
   the guide roller configured to pivot from a standby position out of contact with the strip of material, to an operative position that forces the strip of material into contact with the top of the edge.

3. The apparatus of claim 2, further comprising: an actuator secured to the sub-frame and the pivot block and configured to force the guide roller to pivot from the standby position to the operative position.

4. The apparatus of claim 2, wherein the pre-shaper includes a pair of angled shaping faces respectively configured to engage with outer edges of the strip of material and configured to partially fold outer edges of the strip of material down onto the first and second sides.

5. The apparatus of claim 2, wherein the conformer comprises a conformance wheel, the conformance wheel comprising:
   a hub;
   a pair of discs mounted spaced apart on the hub and configured to rotate, wherein each disc of the pair of discs comprises a chamfered face configured to engage with edges of the strip of material to force edges of the strip of material to conform to the first and second sides of the edge of the structure;
   springs configured to bias the pair of discs toward each other and against the edges of the strip of material; and
   a pair of actuators configured to force the pair of discs to move away from each other.

6. The apparatus of claim 2, the end effector further comprising a post compaction assembly comprising:
   a pair of compaction shoes between which edges of the strip of material may be received;
   a pair of actuators configured to force the pair of compaction shoes toward each other to compact the strip of material against the first and second sides of the edge of the structure.

7. The apparatus at claim 2, the end effector further comprising a post compaction assembly comprising:
   a pair of compaction shoes spaced apart tram each other; and
   actuators coupled with the pair of compaction shoes and configured to compact the strip of material against the first and second sides of the structure.

8. The apparatus of claim 2, wherein the conformer comprises
   a conformance wheel configured to form the strip of material down onto sides of the structure along the edge.

9. The apparatus of claim 8, wherein the conformance wheel includes a pair of conformance discs configured to engage with the strip of material and conform the strip of material to the first and second sides of the edge of the structure.

10. The apparatus of claim 9, the conformance wheel further comprising:
a hub, wherein the pair of conformance discs are mounted in spaced apart relationship on the hub; and
springs configured to bias the pair of conformance discs toward each other and into engagement with the strip of material.

11. The apparatus of claim 9, the conformance wheel further comprising:
the pair of conformance discs being spaced apart a distance less than a width of the strip of material, and
each conformance disc of the pair of conformance discs comprises an inner chamfered surface configured to engage with the strip of material.

12. The apparatus of claim 8, further comprising:
the guide rover configured to guide the strip of material from the spool to the cutter and the compaction shoe.

13. The apparatus of claim 1, the end effector further comprising:
a clamp configured to clamp the strip of material to the cutter assembly, wherein the cutter assembly is mounted to the sub-frame on an angle bracket and the actuator that connects the sub-frame to the frame is configured to vertically displace the sub-frame from the frame.

14. The apparatus of claim 13, wherein the clamp includes a vacuum suction device.

15. The apparatus of claim 1, wherein the cutter comprises a blade configured to transversely displace across the strip of material and cut the strip of material, and
the cutting assembly further comprises:
a clamp on an end of a piston rod in a first actuator mounted on the pivot block and configured to clamp the strip of material as the strip of material is being cut, and
a second actuator configured to displace the blade across and through the strip of material, such that the second actuator extends out from a side, which faces the frame, of the pivot block and aligns with a slot across the pivot block.

16. The apparatus of claim 15, further comprising:
a blade holder configured to hold the blade; and
a chiller fitting on the blade holder configured to chill the blade in the blade holder.

17. The apparatus of claim 15, wherein the pivot block comprises a pair of downwardly extending lateral curbs configured to engage outer edges of the strip of material and transversely align the strip of material with the blade.

18. The apparatus of claim 1, wherein the compaction shoe comprises a spring-loaded mounting, the spring-loaded mounting configured to bias the compaction shoe to compact the strip of material against the top of the edge of the structure.

19. The apparatus of claim 1, wherein the structure is mounted within a three-dimensional coordinate system known to a controller, and the controller is configured to translate coordinates of the structure to the manipulator in order to maintain the end effector along the length of the edge.

20. The apparatus of claim 1, further comprising:
a spring-loaded suspension assembly mounting the compaction shoe for compliant movement along the edge and biasing the compaction shoe into engagement with the edge with a preselected level of force.

21. A method of applying a strip of material along an edge of a structure, comprising:
moving an apparatus along the edge, wherein the apparatus comprises:
an end effector connected to a manipulator configured to move the end effector along a length of the edge of the structure and follow any: curves, twists, contours, rotations in contour, or undulations, along the edge of the structure and maintain a center of a width of the strip of material aligned with a centerline of the edge of the structure as the end effector traverses a length of the structure, wherein the end effector comprises:
an actuator that connects a sub-frame to a frame;
a spool connected to a front end of the frame and configured to hold the strip of material;
a guide roller mounted on a pair of arms secured to a forward end of a pivot block and configured to guide and compress the strip of material from the spool onto the edge of the structure, the pivot block configured to pivot about a shaft attached between a pivot bracket and the frame;
a cutter assembly comprising a cutter configured to cut the strip of material;
a compaction shoe on the sub-frame configured to compact the strip of material onto a top of the edge of the structure; and
a pre-shaper on the sub-frame comprising a shaping face configured to partially shape the strip of material down onto first and second sides of the edge of the structure;
feeding the strip of material from the apparatus onto the edge as the apparatus moves along the edge;
pre-shaping outer edges of the strip of material away from the edge toward sides of the structure; and
conforming the outer edges of the strip of material to the sides of the structure, by passing the outer edges of the strip of material through a conformance wheel.

22. The method of claim 21, further comprising:
passing the outer edges of the strip of material between a pair of compaction shoes, and
compacting the outer edges of the strip of material against the sides of the structure using the pair of compaction shoes.

23. The method of claim 21, further comprising:
compacting the outer edges of the strip of material against the sides of the structure, including engaging the outer edges of the strip of material with a pair of discs, and biasing the pair of discs toward each other.

24. A method of applying an adhesive material strip along an edge of a structure, using an apparatus comprising:
an end effector connected to a manipulator configured to move the end effector along a length of the edge of the structure and follow any: curves, twists, contours, rotations in contour, or undulations, along the edge of the structure and maintain a center of a width of the adhesive material strip aligned with a centerline of the edge of the structure as the end effector traverses a length of the structure, wherein the end effector comprises:
an actuator that connects a sub-frame to a frame;
a spool connected to a front end of the frame and configured to hold the adhesive material strip;
a guide roller mounted on a pair of arms secured to a forward end of a pivot block and configured to guide and compress the adhesive material strip from the spool onto the edge of the structure, the pivot block configured to pivot about a shaft attached between a pivot bracket and the frame;

a cutter assembly comprising a cutter configured to cut the adhesive material strip;

a compaction shoe on the sub-frame configured to compact the adhesive material strip onto a top of the edge of the structure; and a pre-shaper on the sub-frame comprising a shaping face configured to partially shape the adhesive material strip down onto first and second sides of the edge of the structure;

wherein the method comprises:

drawing the adhesive material strip from the spool;

heating the adhesive material strip;

feeding the adhesive material strip to the guide roller;

guiding the adhesive material strip onto the edge of the structure;

compacting the adhesive material strip onto the edge;

shaping outer edges of the adhesive material strip by partially folding the outer edges of the adhesive material strip;

conforming the adhesive material strip onto sides of the structure; and, compacting the outer edges of the adhesive material strip against the sides of the structure.

25. The method of claim 24, further comprising:

clamping the adhesive material strip; and cutting the adhesive material strip by drawing the cutter through the adhesive material strip.

* * * * *